US012467755B2

(12) United States Patent
Karlsson et al.

(10) Patent No.: US 12,467,755 B2
(45) Date of Patent: Nov. 11, 2025

(54) INDOOR LOCATION-BASED SERVICE

(71) Applicant: Microsoft Technology Licensing, LLC, Redmond, WA (US)

(72) Inventors: Börje Felipe Fernandes Karlsson, Redmond, WA (US); Yuanchao Shu, Redmond, WA (US); Ruogu Du, Redmond, WA (US); Yi Jiang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 704 days.

(21) Appl. No.: 17/056,380

(22) PCT Filed: Jun. 18, 2019

(86) PCT No.: PCT/US2019/037592
§ 371 (c)(1),
(2) Date: Nov. 17, 2020

(87) PCT Pub. No.: WO2020/005636
PCT Pub. Date: Jan. 2, 2020

(65) Prior Publication Data
US 2021/0190505 A1    Jun. 24, 2021

(30) Foreign Application Priority Data
Jun. 29, 2018   (CN) .......................... 201810714698.1

(51) Int. Cl.
*G01C 21/20*       (2006.01)
*G01C 21/00*       (2006.01)
(Continued)

(52) U.S. Cl.
CPC ......... *G01C 21/206* (2013.01); *G01C 21/383* (2020.08); *G01C 21/3867* (2020.08);
(Continued)

(58) Field of Classification Search
CPC ........................... G01C 21/206; G01C 21/383; G01C 21/3867; H04W 4/024; H04W 4/025; H04W 4/33; H04W 4/021
See application file for complete search history.

(56) References Cited

U.S. PATENT DOCUMENTS

| 2010/0057354 A1* | 3/2010 | Chen ...................... G01C 21/20 |
| | | 340/995.19 |
| 2010/0299065 A1* | 11/2010 | Mays ................... G01C 21/206 |
| | | 707/E17.089 |

(Continued)

FOREIGN PATENT DOCUMENTS

| CN | 103674017 A | 3/2014 |
| CN | 106996782 A | 8/2017 |
| CN | 107367278 A | 11/2017 |

OTHER PUBLICATIONS

"Notice of Allowance Issued in European Patent Application No. 19735083.8", Mailed Date: Aug. 26, 2022, 7 Pages.

(Continued)

*Primary Examiner* — Abby Lin
*Assistant Examiner* — Renee LaRose
(74) *Attorney, Agent, or Firm* — Schwegman Lundberg & Woessner, P.A.

(57) ABSTRACT

In implementations of the subject matter described herein, a solution for providing an indoor location-based service is provided. In this solution, a floor plan about a first floor of a first building comprising at least one floor is obtained. A first map for the first floor is generated based on the floor plan. The first map includes a plurality of vertices and edges, where one vertex corresponds to a position on the first floor, an edge connecting two vertices represents a physical object or a passable path on the first floor, and two positions corresponding to the two vertices are located at the physical (Continued)

object or on the passable path. Moreover, a location-based service is provided to a user at least based on the first map.

17 Claims, 19 Drawing Sheets

(51) Int. Cl.
    *H04W 4/02*         (2018.01)
    *H04W 4/024*      (2018.01)
    *H04W 4/33*       (2018.01)

(52) U.S. Cl.
    CPC ........... *H04W 4/024* (2018.02); *H04W 4/025* (2013.01); *H04W 4/33* (2018.02)

(56) References Cited

U.S. PATENT DOCUMENTS

| | | | |
|---|---|---|---|
| 2011/0081919 A1 | 4/2011 | Das et al. | |
| 2011/0082638 A1* | 4/2011 | Khorashadi | G01C 21/206 |
| | | | 701/532 |
| 2014/0066103 A1 | 3/2014 | Das et al. | |
| 2014/0113665 A1 | 4/2014 | Li et al. | |
| 2017/0332203 A1* | 11/2017 | Nagpal | H04W 4/029 |
| 2021/0190505 A1 | 6/2021 | Karlsson et al. | |

OTHER PUBLICATIONS

"Office Action Issued in Chinese Patent Application No. 201810714698. 1", Mailed Date: Mar. 28, 2023, 12 Pages.
"Notice of Allowance Issued in European Patent Application No. 19735083.8", Mailed Date: Dec. 1, 2022, 2 Pages.
"Office Action Issued in Chinese Patent Application No. 201810714698. 1", Mailed Date: Nov. 1, 2022, 16 Pages.
Ahmed, et al., "Improved Automatic Analysis of Architectural Floor Plans", In International Conference on Document Analysis and Recognition, Sep. 18, 2011, pp. 864-869.
Alzanot, et al., "CrowdInside: Automatic Construction of Indoor Floorplans", In Proceedings of the 20th International Conference on Advances in Geographic Information Systems, Nov. 6, 2012, pp. 99-108.
Asmar, et al., "Smartslam: localization and mapping across multi-environments", In Proceedings of IEEE International Conference on Systems, Man and Cybernetics, Oct. 10, 2004, pp. 5240-5245.
Chen, et al., "Rise of the Indoor Crowd: Reconstruction of Building Interior View via Mobile Crowdsourcing", In Proceedings of the 13th ACM Conference on Embedded Networked Sensor Systems, Nov. 1, 2015, pp. 59-71.
Chen, et al., "Crowd Map: Accurate Reconstruction of Indoor Floor Plans from Crowdsourced Sensor-Rich Videos", In IEEE 35th International Conference on Distributed Computing Systems, Jun. 29, 2015, 10 Pages.
Chung, et al., "Indoor Location Sensing using Geomagnetism", In Proceedings of the 9th International Conference on Mobile Systems, Applications, and Services,, Jun. 28, 2011, pp. 141-154.
Constandache, et al., "Did you see bob?: Human localization using mobile phones", In Proceedings of the Sixteenth Annual International Conference on Mobile Computing and Networking, Sep. 20, 2010, pp. 149-160.
Constandache, et al., "Towards Mobile Phone Localization without War-Driving", In Proceedings of the 29th Conference on Information Communications, Mar. 2010, 9 Pages.
Davidson, et al., "MonoSLAM: Real-Time Single Camera SLAM", In Journal of IEEE Transactions on Pattern Analysis and Machine Intelligence, vol. 29, Issue 6, Jun. 2007, pp. 1052-1067.
Dong, et al., "iMoon: Using Smartphones for Image-based Indoor Navigation Categories and Subject Descriptors", In Proceedings of the 13th ACM Conference on Embedded Networked Sensor Systems, Nov. 1, 2015, pp. 85-97.

Elhamshary, et al., "SemSense: Automatic Construction of Semantic Indoor Floorplans", In Proceedings of International Conference on Indoor Positioning and Indoor Navigation, Oct. 13, 2015, 11 Pages.
Gao, et al., "Jigsaw: indoor floor plan reconstruction via mobile crowdsensing", In Proceedings of the 20th Annual International Conference on Mobile Computing and Networking, Sep. 7, 2014, pp. 249-260.
Hahnel, et al., "An Efficient FastSLAM Algorithm for Generating Maps of Large-Scale Cyclic Environments from Raw Laser Range Measurements", In Proceedings of IEEE/RSJ International Conference on Intelligent Robots and Systems, Oct. 27, 2003, pp. 206-211.
Heras, et al., "Statistical Segmentation and Structural Recognition for Floor Plan Interpretation", In International Journal on Document Analysis and Recognition, Sep. 1, 2014, 18 Pages.
Jiang, et al., "Hallway based Automatic Indoor Floorplan Construction using Room Fingerprints", In Proceedings of the ACM international Joint Conference on Pervasive and Ubiquitous Computing, Sep. 8, 2013, pp. 315-324.
Levachkine, Serguei, "Raster to Vector Conversion of Color Cartographic Maps", In International Workshop on Graphics Recognition, Jul. 30, 2003, pp. 50-62.
Liu, et al., "Raster-to-Vector: Revisiting Floorplan Transformation", In Proceedings of the IEEE Conference on Computer Vision and Pattern Recognition, Oct. 22, 2017, pp. 2195-2203.
Lyardet, et al., "CoiNS: Context Sensitive Indoor Navigation System", In Proceedings of the Eighth IEEE International Symposium on Multimedia, Dec. 11, 2006, 8 Pages.
Mace, et al., "A System to Detect Rooms in Architectural Floor Plan Images", In Proceedings of the 9th IAPR International Workshop on Document Analysis Systems, Jun. 9, 2010, pp. 167-174.
"International Search Report and Written Opinion Issued in PCT Application No. PCT/US19/037592", Mailed date: Sep. 19, 2019, 12 Pages.
Peter, et al., "Grammar Supported Indoor Mapping", In Proceedings of the 26th International Cartographic Conference, Aug. 2013, 18 Pages.
Peter, et al., "Using Photographed Evacuation Plans to Support Mems Imu Navigation", In Proceedings of the 2011 International Conference on Indoor Positioning and Indoor Navigation, Sep. 21, 2011, 4 Pages.
Philipp, et al., "Mapgenie: Grammar-Enhanced Indoor Map Construction from Crowd-Sourced Data", In IEEE International Conference on Pervasive Computing and Communications (PerCom),, Mar. 24, 2014, pp. 139-147.
Shen, et al., "Walkie-Markie: Indoor Pathway Mapping Made Easy", In Proceedings of the 10th USENIX Conference on Networked Systems Design and Implementation, Apr. 2013, pp. 85-98.
Shu, et al., "Last-Mile Navigation Using Smartphones", In Proceedings of the 21st Annual International Conference on Mobile Computing and Networking, Sep. 7, 2015, pp. 512-524.
Shu, et al., "Magicol: Indoor Localization Using Pervasive Magnetic Field and Opportunistic WiFi Sensing", In IEEE Journal of Selected Areas in Communications, vol. 33, Issue 7, Jul. 2015, pp. 1443-1457.
Surmann, et al., "An Autonomous Mobile robot with a 3D Laser Range Finder for 3d Exploration and Digitalization of Indoor Environments", In Robotics and Autonomous Systems vol. 45, Issue 3, Dec. 2003, pp. 181-198.
Tardós, et al., "Robust Mapping and Localization in Indoor Environments Using Sonar Data", In International Journal of Robotics Research, vol. 21, Issue 4, Apr. 1, 2002, pp. 311-330.
Wang, et al., "No Need to War-Drive Unsupervised Indoor Localization", In Proceedings of the 10th International Conference on Mobile Systems, Applications, and Services, Jun. 25, 2012, pp. 197-210.
Yin, et al., "ppNav: Peer-to-Peer Indoor Navigation for Smartphones", In IEEE 22nd International Conference on Parallel and Distributed Systems, Dec. 13, 2016, pp. 104-111.
Zheng, et al., "Travi-Navi: Self-deployable Indoor Navigation System", In Proceedings of the 20th annual international Conference on Mobile computing and networking, Sep. 7, 2014, pp. 471-482.

(56) References Cited

OTHER PUBLICATIONS

Zhou, et al., "BatMapper: Acoustic Sensing Based Indoor Floor Plan Construction Using Smartphones", Proceedings of the 15th Annual International Conference on Mobile Systems, Applications, and Services, Jun. 19, 2017, pp. 42-55.

Hori, et al., "Raster-to-Vector Conversion by Line Fitting Based on Contours and Skeletons", In Proceedings of 2nd International Conference on Document Analysis and Recognition, Oct. 20, 1993, pp. 353-358.

Zhang, et al., "iLocScan: Harnessing Multipath for Simultaneous Indoor Source Localization and Space Scanning", In Proceedings of the 12th ACM Conference on Embedded Network Sensor Systems, Nov. 3, 2014, pp. 91-104.

"Notice of Allowance Issued in Chinese Patent Application No. 201810714698.1", Mailed Date: Aug. 2, 2023, 4 Pages.

\* cited by examiner

300 ⟶

```
{
    "width": 1088,
    "height": 589.503
    "vertices": [
        {
            "key": 5600,
            "value": {
                "label": "",
                "ID": 5600, "Y": 9.554, "X": 362, "type": 8,
                "edges": [6592, 6593]}
        },
        {
            "key": 5527,
            "value": {
                "label": "HIGH FLOOR ELEVATOR",
                "ID": 5527, "Y": 9.554, "X": 286.4, "type": 0,
                "edges": [6592]}
        }
        {
            "key": 5528,
            "value": {
                "label": "LOW FLOOR ELEVATOR ",
                "ID": 5528, "Y": 9.554, "X": 437.6, "type": 0,
                "edges": [6593]}
        }
    ]
    "edges": [
        {
            "key": 6592,
            "value": { "elemClass": null
                "endVertices": [5527, 5600],
                "ID": 6592, "type": 8,
                "elemID": null}
        },
        {
            "key": 6593,
            "value": { "elemClass": null
                "endVertices": [5528, 5600],
                "ID": 6593, "type": 8,
                "elemID": null}
        }
    ]
```

FIG. 3

1210
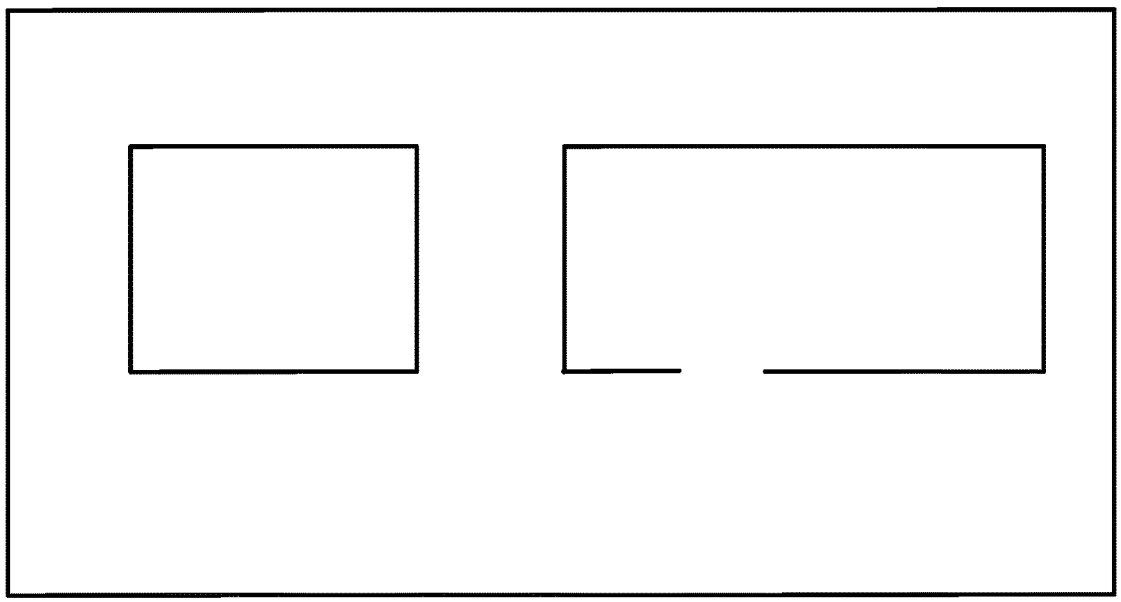
1220
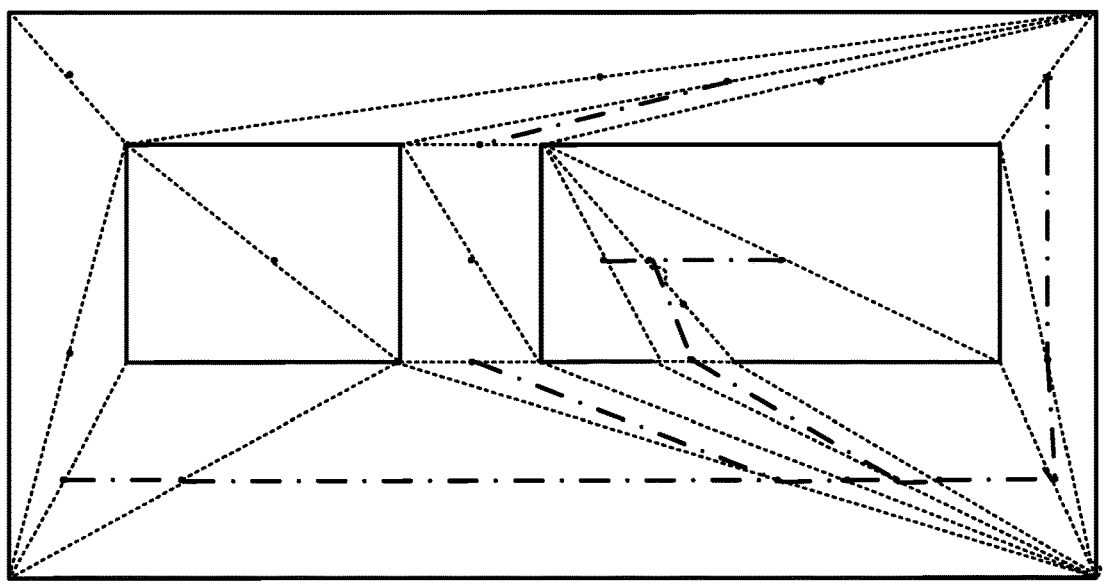
FIG. 12

1500

1700

INDOOR LOCATION-BASED SERVICE

CROSS-REFERENCE TO RELATED APPLICATION

This application is a U.S. National Stage Filing under 35 U.S.C. 371 of International Patent Application Serial No. PCT/US2019/037592, filed Jun. 18, 2019, and published as WO 2020/005636 A1 on Jan. 2, 2020, which claims priority to Chinese Application No. 201810714698.1, filed Jun. 29, 2018; which applications and publication are incorporated herein by reference in their entirety.

BACKGROUND

Indoor location-based services normally include services such as indoor positioning, indoor navigation and the like. Conventional indoor positioning and navigation solutions mainly include solutions that combine maps (for example, floor plans and other fingerprint maps), such as positioning and navigation solutions based on Wi-Fi signals, geomagnetic signals or Bluetooth beacons, and solutions based on inertia navigation technologies. However, these solutions often have high external dependencies or high maintenance overhead which makes them hard to be deployed and scaled in a large-scale. Moreover, the conventional indoor navigation solutions further include infrastructure-independent solutions, such as an indoor navigation solution based on a leader-follower model in which a leader records his/her own travelling route and shares it with others so that others can follow the route of the leader to find the destination. However, this kind of solutions often require an existing reference route (i.e., the route of the leader). When there is no reference route, this kind of solutions may not be able to work.

SUMMARY

In accordance with implementations of the subject matter described herein, a solution for providing an indoor location-based service is provided. In this solution, a floor plan about a first floor of a first building comprising at least one floor is obtained. A first map is generated for the first floor based on the floor plan. The first map includes a plurality of vertices and edges, where one vertex corresponds to a position on the first floor, an edge connecting two vertices represents a physical object or a passable path on the first floor, and two positions corresponding to the two vertices are located at the physical object or on the passable path. Moreover, a location-based service is provided to a user at least based on the first map.

The solution in accordance with implementations of the subject matter described herein enables map understanding in a way of converting a floor plan into a generic indoor map representation in a specific format by understanding the geometrical structure of the floor plan and extracting passable paths therefrom. The generic indoor map representation is able to be used to provide indoor navigation services and other location-based services. Moreover, this generic indoor map representation may be used as an infrastructure to serve other location-based applications. Furthermore, this generic indoor map representation may be further combined with other data sources and a third-party navigation application to improve the quality of data collection and improve reliability of indoor navigation. By binding the generic indoor map representation with corresponding environment data, a real-time indoor navigation service can be provided independent of any infrastructure (such as Wi-Fi hotspots or Bluetooth beacons).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 illustrates an example of a generic map representation in accordance with some implementations of the subject matter described herein;

FIG. 12 illustrates a schematic diagram of maps without topology information and with topology information in accordance with some implementations of the subject matter described herein;

Throughout the drawings, the same or similar reference symbols refer to the same or similar elements.

DETAILED DESCRIPTION

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

Example Environment

Figure 1:
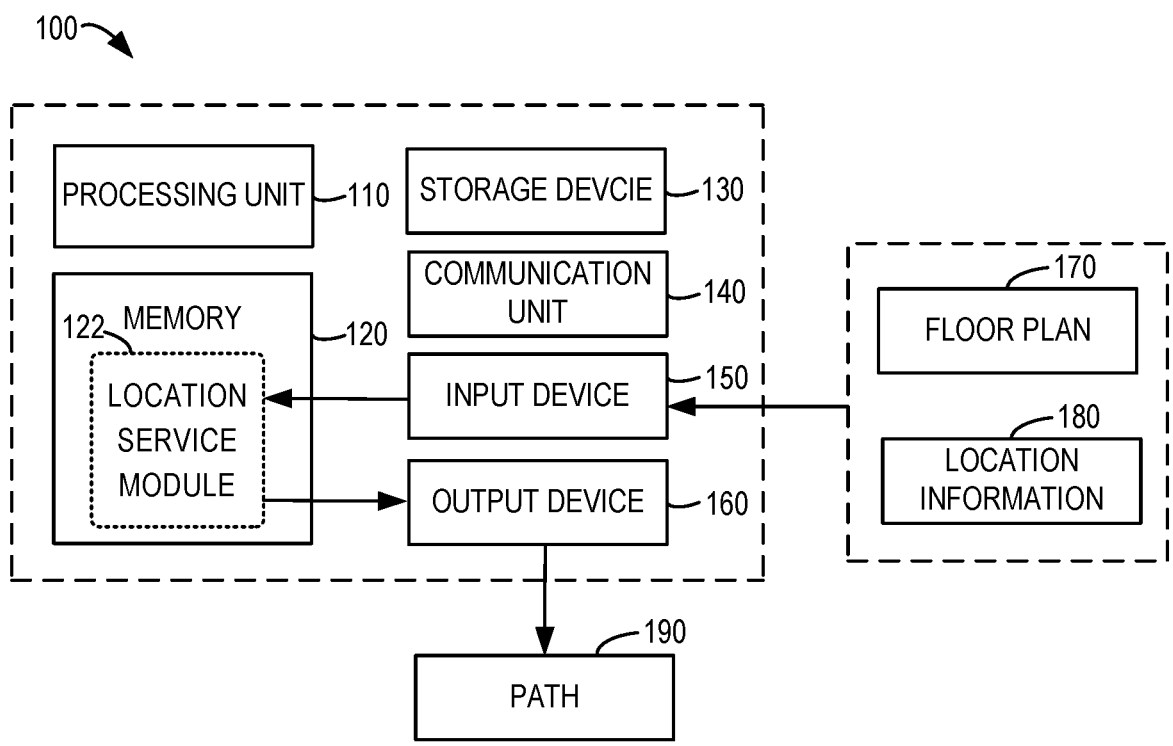
FIG. 1 illustrates a block diagram of a computing device in which implementations of the subject matter described herein can be implemented.

Basic principles and various example implementations of the subject matter described herein will now be described with reference to drawings. FIG. 1 illustrates a block diagram of a computing device 100 in which various implementations of the subject matter described herein can be implemented. It would be appreciated that the computing device 100 shown in FIG. 1 is merely for purpose of illustration, without suggesting any limitation to the functions and scopes of implementations of the subject matter described herein in any manner. As shown in FIG. 1, the computing device 100 includes a computing device 100 in form of a generic computing device. Components of the computing device 100 may include, but are not limited to, one or more processors or processing units 110, a memory 120, a storage device 130, one or more communication units 140, one or more input devices 150 and one or more output devices 160.

In some implementations, the computing device 100 may be implemented as any user terminal or service terminal having computing capability. The service terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital cameras/video player, positioning device, television receiver, radio broadcast receiver, E-book device, gaming device or any combination thereof, including the accessories and peripherals of these devices, or any combination thereof. It is be contemplated that the computing device 100 can support any type of interface for a user (such as "wearable" circuitry and the like).

The processing unit 110 may be a physical or virtual processor and can implement various processes based on the programs stored in the memory 120. In a multi-processor system, multiple processing units execute computer-executable instructions in parallel so as to improve the parallel processing capacity of the computing device 100. The processing unit 110 may also be referred to as a central processing unit (CPU), a microprocessor, a controller or a microcontroller.

The computing device 100 typically includes various computer storage medium. Such medium can be any medium accessible by the computing device 100, including, but not limited to, volatile and non-volatile medium, or detachable and non-detachable medium. The memory 120 can be a volatile memory (for example, a register, cache, random access memory (RAM)), non-volatile memory (such as a read-only memory (ROM), electrically erasable programmable read-only memory (EEPROM), or a flash memory), or any combination thereof. The memory 120 may include a location service module 122 configured to perform functions of various implementations described herein. The location service module 122 may be accessed and operated by the processing unit 110 to implement corresponding functions.

The storage device 130 may be detachable and non-detachable medium and may include machine-readable medium capable of storing information and/or data and can be accessed in the computing device 100. The computing device 100 may further include other detachable/non-detachable and volatile/non-volatile memory medium. Although not shown in FIG. 1, it is possible to provide a disk drive for reading from and writing into a detachable and non-volatile disks and a disc drive for reading from and writing into a detachable and non-volatile disc. In such cases, each drive may be connected to a bus (not shown) via one or more data medium interfaces.

The communication unit 140 communicates with a further computing device via the communication medium. In addition, the functions of the components of the computing device 100 may be implemented by a single computing cluster or multiple computing machines that can communicate via communication connection. Therefore, the computing device 100 may operate in a networked environment using a logical connection with one or more other servers, personal computers (PCs) or further general network nodes.

The input device 150 may be one or more of a variety of input devices, such as a mouse, keyboard, touch screen, tracking ball, voice-input device and the like. The output device 160 may be one or more of a variety of output devices, such as a display, loudspeaker, printer and the like. By means of the communication unit 140, the computing device 100 may further communicate with one or more external devices (not shown) such as the storage devices and display device, with one or more devices enabling the user to interact with the computing device 100, or any device (such as a network card, modem, and the like) enabling the computing device 100 to communicate with one or more other computing devices. Such communication may be performed via input/output (I/O) interfaces (not shown).

The computing device 100 may provide an indoor location-based service in accordance with implementations of the subject matter described herein. When providing the indoor location-based service, the computing device 100 may obtain a floor plan 170 about floors of a building via the input device 150. The computing device 100 may generate a map with topology information (such as information related to paths) about a floor based on the obtained floor plan 170. For example, the map includes a plurality of vertices and edges, among which a vertex corresponds to a position on the floor and an edge connecting two vertices represents a physical object or a passable path connecting two positions corresponding to the two vertices. The computing device 100 may store the generated map into the storage device 130, to facilitate providing a location-based service to a user of the computing device 100 at least based on the map. For example, the computing device 100 may obtain, through the input device 150, information 180 about the user's starting position and destination position. Then, the computing device 100 may determine a path 190 from the starting position to the destination position at least based on the generated map, for example, the path 190 may be represented by a series of vertices and edges from the plurality of vertices and edges on the map. The computing device 100 may further provide the path 190 to the user through the output device 160.

In some implementations, as an alternative of being integrated into a single device, some or all components of the computing device 100 may also be arranged in form of cloud computing architecture. In the cloud computing architecture, the components may be provided remotely and work together to implement the functions described in the subject matter described herein. In some implementations, cloud computing provides computing, software, data access and storage service which will not require end users to be aware of the physical positions or configurations of the systems or hardware providing these services. In various implementations, cloud computing provides the services via a wide area network (such as Internet) using proper protocols. For example, a cloud computing provider provides applications over wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functions described herein from a service provider at a remote location, as will be described below with reference to FIG. 2. Alternatively, they may be provided from a conventional server or be installed directly or otherwise on a client device.

As described above, conventional indoor positioning and navigation solutions mainly include solutions with maps (for example, a floor plan and other fingerprint maps), such as a positioning and navigation solution based on Wi-Fi signals, geomagnetic signals or Bluetooth beacons, and a solution based on inertia navigation technologies and the like. However, these solutions generally have high external dependencies or high maintenance overhead, thus being difficult to be deployed and scaled in a large-scale. Further, the conventional indoor navigation solutions further include schemes independent of infrastructure, such as an indoor navigation solution based on a leader-follower model in which the leader records his/her own travelling route and shares it with others so that others can follow the route of the leader to find the destination. However, this kind of solutions generally require an existing reference route (i.e., the route of the leader). In the absence of the reference route, these solutions may not be able to work.

Some problems existed in the current indoor location-based service solutions are discussed as above. In accordance with implementations of the subject matter described herein, there is provided a solution for providing an indoor location-based service which is aimed at solving one or more of the above and other potential problems. The solution in accordance with implementations of the subject matter described herein enables map understanding in a way of converting a floor plan into a generic indoor map representation in a specific format by understanding the geometrical structure of the floor plan and extracting passable paths therefrom. The generic indoor map representation may be used to provide indoor navigation services and other location-based services. Moreover, the generic indoor map representation may be used as an infrastructure to serve other location-based applications. Furthermore, the generic indoor map representation may be further combined with other data sources and a third-party navigation application, to improve the quality of data collection and reliability of the indoor navigation. By binding the generic indoor map representation with the corresponding environment data, real-time indoor navigation services can be provided independent of any infrastructure (such as Wi-Fi hotspots or Bluetooth beacons).

Various implementations of the solution will be described below in detail with reference to the drawings.

System Architecture

Figure 2:
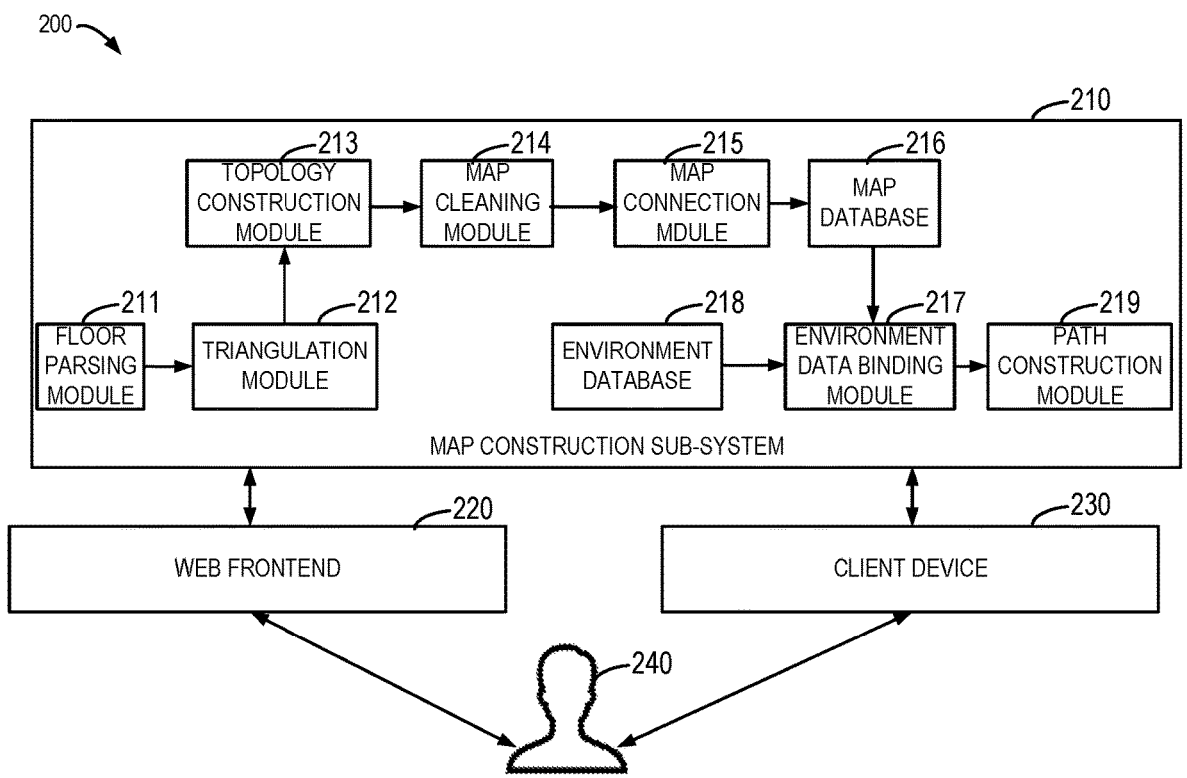
FIG. 2 illustrates a block diagram of an example system for providing indoor location-based services in accordance with some implementations of the subject matter described herein.

FIG. 2 illustrates a block diagram of an example system 200 for providing indoor location-based services in accordance with some implementations of the subject matter described herein. It is to be understood that the structure and function of the system 200 are described merely for purpose of illustration, without suggesting any limitation to the scope of the subject matter described herein. Implementations of the subject matter described herein may be embodied in different structures and/or functions.

The system 200 may include a map construction sub-system 210, a web frontend 220 and a client device 230. In some implementations, the map construction sub-system 210 may be configured to generate, with a floor plan uploaded by a user 240 via the web frontend 220 as an input, a generic map representation with a specific format by employing a series of processing technologies; and provide indoor navigation and another location-based service to the user 240 utilizing the generic map representation. In some implementations, at least a part of the map construction sub-system 210 may be implemented as a location service module 122 of the computing device 100 shown in FIG. 1, i.e., implemented as a computer program module. For example, in the embodiment shown in FIG. 2, the map construction sub-system 210 may be deployed at a cloud. Alternatively, in other implementations, the map construction sub-system 210 may also be implemented partly or entirely through a hardware device.

The user 240 may interact with the map construction sub-system 210 via the web frontend 220. For example, the web frontend 220 allows the user 240 to upload the floor plan via a browser, modify the generic map representation having the specific format generated by the map construction sub-system 210, query information specific to a position (for example, query a path from a starting position to a destination position) or look up points of interest and so on.

The client device 230 may be implemented as a terminal device such as the user 240 (for example, a mobile phone) or other electronic devices, and it may provide a real-time indoor navigation service to the user 240. For example, the user 240 may download paths queried via the web frontend 220 to the client device 230. The client device 230 may provide real-time or quasi-real-time navigation instructions to the user 240 based on the downloaded paths. Moreover, the client device 230 may be equipped with various sensors.

During the indoor navigation, the client device 230 may store environment data (such as Wi-Fi signals, geomagnetic signals, barometer signals, and so on) collected by various sensors along a traveling trace of the user 240. These environment data can be uploaded to the map construction sub-system 210 and stored in the environment database (such as an environment database 218) of the map construction sub-system 210, to be bound with the generated generic map representation. The map bound with the environment data can provide reliable navigation instructions.

The principles and/or functions of various modules in the map construction sub-system 210 may be further described below with reference to the drawings. Before the map construction sub-system 210 is introduced in detail, the generic map representation in the specific format according to implementations of the subject matter described herein will be introduced first (the map representation is also referred to as a "MapGraph" herein).

In some implementations, the MapGraph is a file format representing an indoor map. Existing map formats (such as a floor plan) that mainly include raster image and vectorgraph are not suitable for map construction and path construction. For example, the raster image is composed of colored pixels and map related information is hidden therein. Vectorgraph contains too much redundant information, such as color, stroke style and so on, which is of no use to a concise map representation. Moreover, no topology information (namely, information about passable paths) is included in an original map image, which makes it impossible to meet requirements of the indoor location-based service. Regarding these and other potential problems, the MapGraph can store required map-related information concisely.

The definition of the MapGraph similar to a vectorgraph and stores outlines of physical objects (such as a room, a door and so on) of different shapes on the floor. The MapGraph is represented by a data structure based on vertices and edges. For example, FIG. 3 shows an example of the MapGraph 300. As illustrated in FIG. 3, there are three types of items stored in the MapGraph: a map size, vertices and edges. The map size includes map height and width both of which may be derived from the floor plan provided by the user. It is very useful to generate a size-related threshold in the following processing. The vertices may correspond to positions of the floor. For example, vertices in the MapGrap may include vertices about physical objects from the floor plan and vertices representing positions on passable paths generated in following processing. An edge connecting two vertices may represent physical objects (such as corridors, walls and so on) of two positions corresponding to two vertices or a possible path. In this way, both physical objects on the floor and topology information (such as possible paths) of the floor can be represented by the vertices and edges with the MapGraph.

Each vertex in the MapGraph may be represented by a unique vertex identifier ("ID") or a key value ("key"), its coordinates (such as X-coordinate and Y-coordinate), edges ("edges") to which it is connected, and a label ("label") describing extra information ("label"). Each edge is represented by a unique edge ID, the IDs of its two end vertices ("endVertices") and an element ID for extra information ("elemID"). In order to eliminate a confusion between physical object information and topology information and make the MapGraph generation process more traceable, element type is introduced to the vertices and edges, which is represented by the type ("type") in a MapGraph. For example, the type may indicate whether a vertex/edge belongs to the original floor plan or is created during certain process, and whether the vertex/edge indicates a room or belongs to topology information. Several example types of vertices and edges in accordance with some implementations of the subject matter described herein are provided below in Table 1.

TABLE 1

| Type | Module and sub-module of the type created, and explanation to this type |
|---|---|
| 0 | Floor plan parsing module, this type represents a room |
| 1 | Floor plan parsing module, this type belongs to an original floor plan |
| 2 | Floor plan parsing module, door removal sub-module, this type represents a curve |
| 3 | Floor plan parsing module, intersection point removal sub-module, this type represents an intersection point |
| 4 | Floor plan parsing module, overlap removal sub-module, this type represents an overlap |
| 5 | Floor plan parsing module, gap removal sub-module, this type represents a small gap |
| 6 | Floor plan parsing module, gap removal sub-module, this type represents a big gap |
| 7 | Triangulation module |
| 8 | Topology construction module, topology generation sub-module |
| 9 | Topology construction module, rebalancing sub-module |
| 10 | Topology construction module, reconnection sub-module |
| 11 | Topology construction module, explosion optimization sub-module |

Working Principle

As shown in FIG. 2, the map construction sub-system 210 may include a floor parsing module 211, a triangulation module 212, a topology construction module 213, a map cleaning module 214, a map connection module 215, a map database 216, an environment data binding module 217, an environment database 218 and a path construction module 219.

Floor Plan Parsing

In some implementations, the floor parsing module 211 in the map construction sub-system 210 is configured to generate, based on the floor plan about a floor (hereinafter referred to as a "first floor") of a building (hereinafter referred to as a "first building") obtained from the user 240, an initial MapGraph (hereinafter referred to as an "initial map") corresponding to the floor plan. For example, the initial map (namely, initial MapGraph) may include a first group of vertices and edges representing outlines of physical objects on the first floor.

As described above, there are generally two formats of floor plan adopted: a raster image and a vectorgraph. In some implementations, the floor plan in a raster image format may be converted into a floor plan in a vectorgraph format. For example, the above format conversion may be implemented with any technology currently known or to be developed in the future. Commonly used vectorgraph formats may include CDR, DWG, DXF, SVG and so on. Almost all of them employ similar data structures. For the purpose of illustration, the SVG format is used as an example of vectorgraph to describe a conversion from the floor plan to the initial map. It is to be understood that this is only for the purpose of illustration without suggesting any limit to the scope of the subject matter described herein.

A typical SVG file includes many elements, such as <metadata>, <style>, <polyline> and so on. In some implementations, since the MapGraph file only includes size and outline information, width, height and <polyline>, <path>, <text> elements in the SVG file may be extracted while other elements may be discarded to generate the initial MapGraph. The width and height in the SVG file may be used to construct map size and coordinates in the initial MapGraph. Connection information in the <polyline>, <path> and <text> elements of the SVG file may be used to construct vertices and edges in the initial MapGraph. All the key values are generated automatically during the parsing process. Types of the vertices derived from the <polyline> and <path> elements are tagged as "original" (for example, the type 1 in the Table 1) because they are all derived from the floor plan. The type of vertices derived from the <text> element may be tagged as "room" (namely, the type 0 in the Table 1) since it includes information about room of the floor. In some implementations, a separate MapGraph may be created for vertices of the room type, where only room vertices are stored, to facilitate looking up the room subsequently.

Additionally or alternatively, in some implementations, the floor parsing module 211 in the map construction subsystem 210 may further optimize the initial map. For example, the optimized initial map herein is also referred to as a second map. For example, the second map may include a second group of vertices and edges derived by optimizing the first group of vertices and edges.

The initial map generally will not be used directly because there is a lot of redundant information in the initial map, which makes tasks like path construction prone to errors. Moreover, there are also problems like false connection existed in this initial map, which will also have negative impact on system performance. Thus, a preprocessing is needed to the initial map to solve the problems mentioned above.

In some implementations, the floor parsing module 211 may remove redundant information from the initial map to optimize the initial map. The initial map is converted from the floor plan and may contain a lot of redundant information intrinsically. In some implementations, for example, the floor parsing module 211 may identify a specific physical object from the first group of vertices and edges of the initial map and the specific physical object is represented by, for instance, a set of vertices and edges having a specific feature. Examples of specific physical objects may include, but are not limited to, a door, an elevator and so on. The door will be taken as an example of the specific physical object below. In some implementations, the floor parsing module 211 may remove, from the set of vertices and edges representing the door, a redundant vertex and a redundant edge. Other similar redundant information may be processed with a similar method.

Figure 4A:
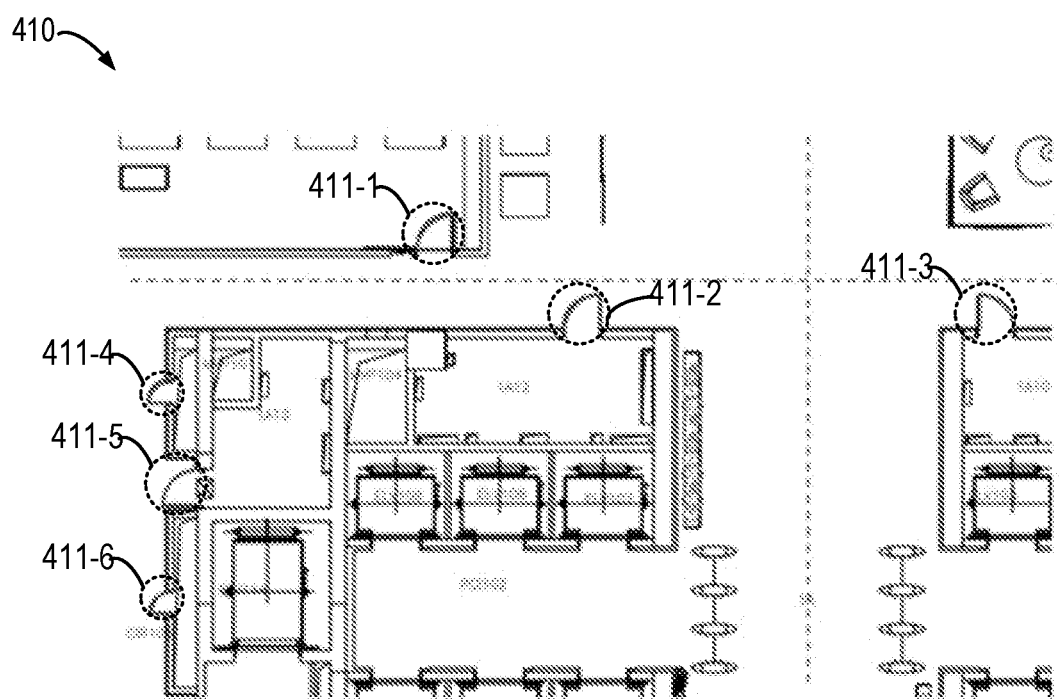
FIG. 4A illustrates a schematic diagram of an example initial map from which redundant information is to be removed in accordance with implementations of the subject matter described herein.

FIG. 4A illustrates a schematic diagram of an example initial map from which redundant information is to be removed in accordance with implementations of the subject matter described herein. As shown in FIG. 4A, the initial map 410 includes a plurality of doors 411-1~411-6 (collectively referred to as "door 411"). These doors isolate connected rooms from corridors which makes it impossible to reach one room from another.

Figure 4B:
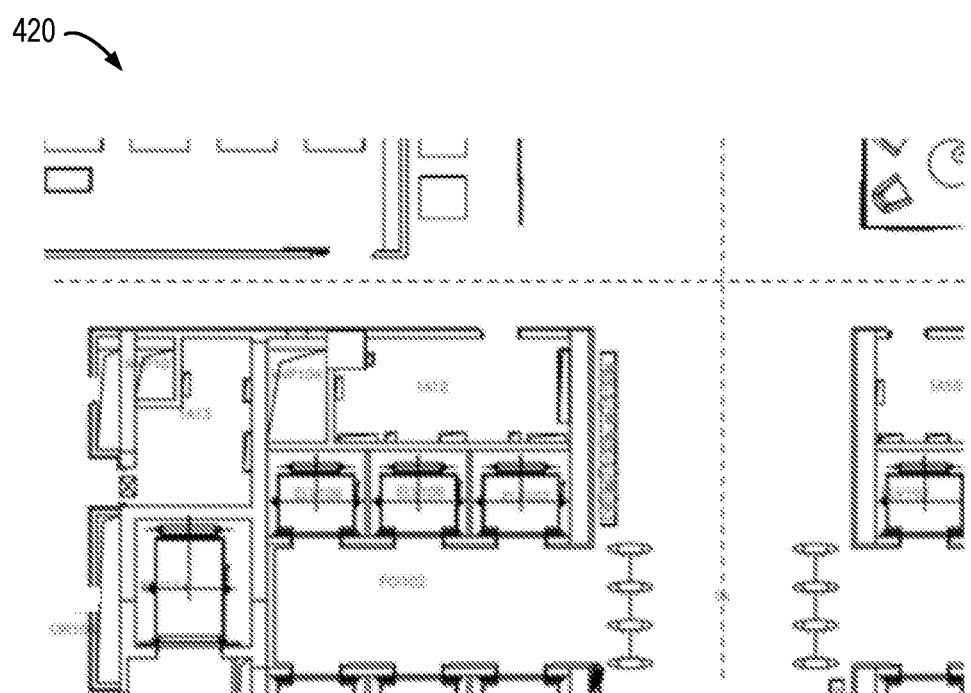
FIG. 4B illustrates a schematic diagram of an example initial map from which redundant information has been removed in accordance with some implementations of the subject matter described herein.

In some implementations, the floor parsing module 211 may remove the plurality of doors 411 in the original map 410 shown in FIG. 4A. It can be observed from the initial map 410 shown in FIG. 4A that the door 411 has specific features. For example, each door 411 is comprised of a curve and line segments near the curve. The floor parsing module 211 may identify this kind of specific features from the first group of vertices and edges of the initial map. In some implementations, the floor parsing module 211 may first detect the curve shape and then traverse nearby edges to find line segments connected with the curve. For a given map size, if the detected curve is too long, it will not be considered as a door. After the specific feature corresponding to the door is detected, the floor parsing module 211 may remove the entire curve firstly and then remove the line segments near the curve. In some implementations, if there is multiple parallel line segments existed at a to be removed position, the floor parsing module 211 may remove all of them. In this way, doors in the initial map 410 are removed as shown in the map 420 of FIG. 4B.

Additionally or alternatively, in some implementations, after redundant information in the initial map is removed, the floor parsing module 211 may further remove the following from the initial map: an overlapped edge, an intersection of edges, and a gap between edges and so on.

Figure 5:
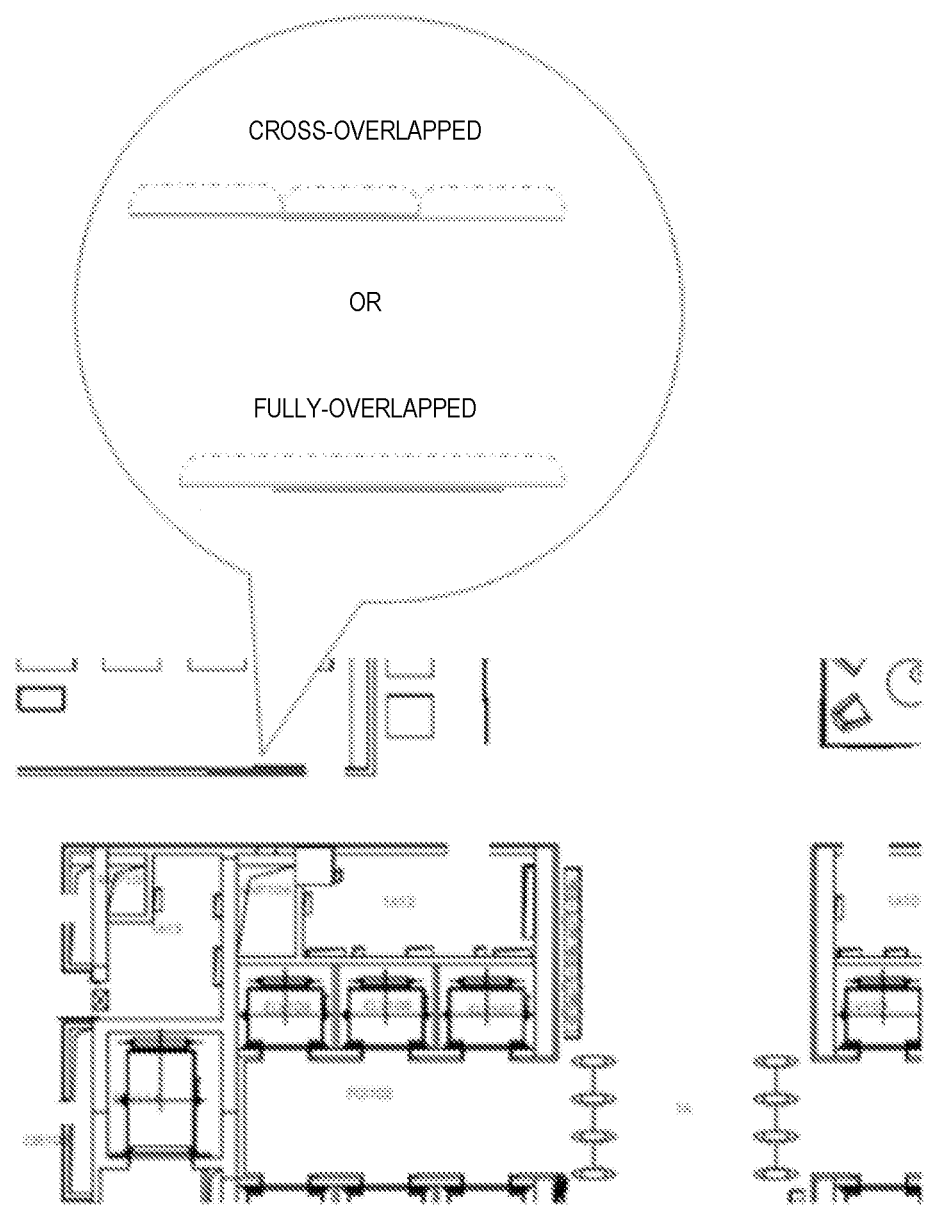
FIG. 5 illustrates a schematic diagram of overlaps that possibly exist in a map in accordance with some implementations of the subject matter described herein.

In some implementations, the floor parsing module 211 may remove an overlapped edge from the initial map. As used herein, the "overlap" refers to the case in which a seemingly single edge is actually composed of several overlapped edges. For example, FIG. 5 illustrates two possible cases of overlapping: cross-overlapped and fully-overlapped. Cross-overlapping indicates that a portion of an edge overlaps with a portion of another edge and fully-overlapping indicates that an edge is entirely overlapped with another edge. To handle the overlaps, the floor parsing module 211 may first perform a spatial clustering process to the edges in the initial map. For example, edges of a same offset and slope may be clustered together to generate collinear edge groups. Then, the floor parsing module 211 may processes these groups based on the type of overlapping. For example, for fully-overlapped edges, the floor parsing module 211 may delete a shorter edge therein. For cross-overlapped edges, the floor parsing module 211 may replace the original two edges with three new edges divided by the vertices of original edges. In this way, the floor parsing module 211 can remove the overlapped edge from the initial map.

Figure 6:
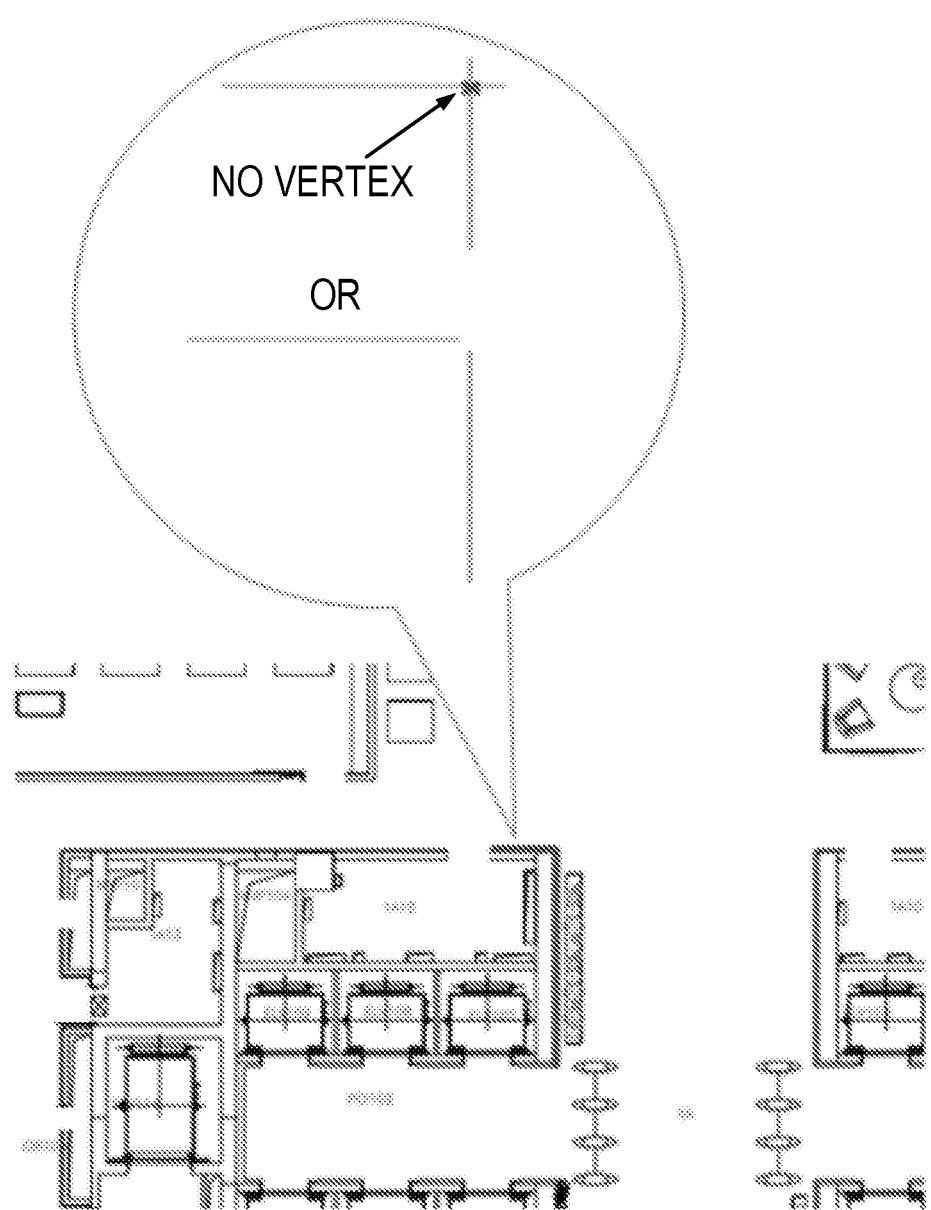
FIG. 6 illustrates a schematic diagram of intersections that possibly exist in a map in accordance with some implementations of the subject matter described herein.

In some implementations, for example, after the overlapped edge is removed, the floor parsing module 211 may remove an edge intersection from the initial map. As used herein, the "intersection" refers to a situation that though two edges seem to be intersected with each other, there is no vertex on the intersection point or these two edges are very close to each other. For example, FIG. 6 illustrates two possible cases of the intersection.

Figure 7:
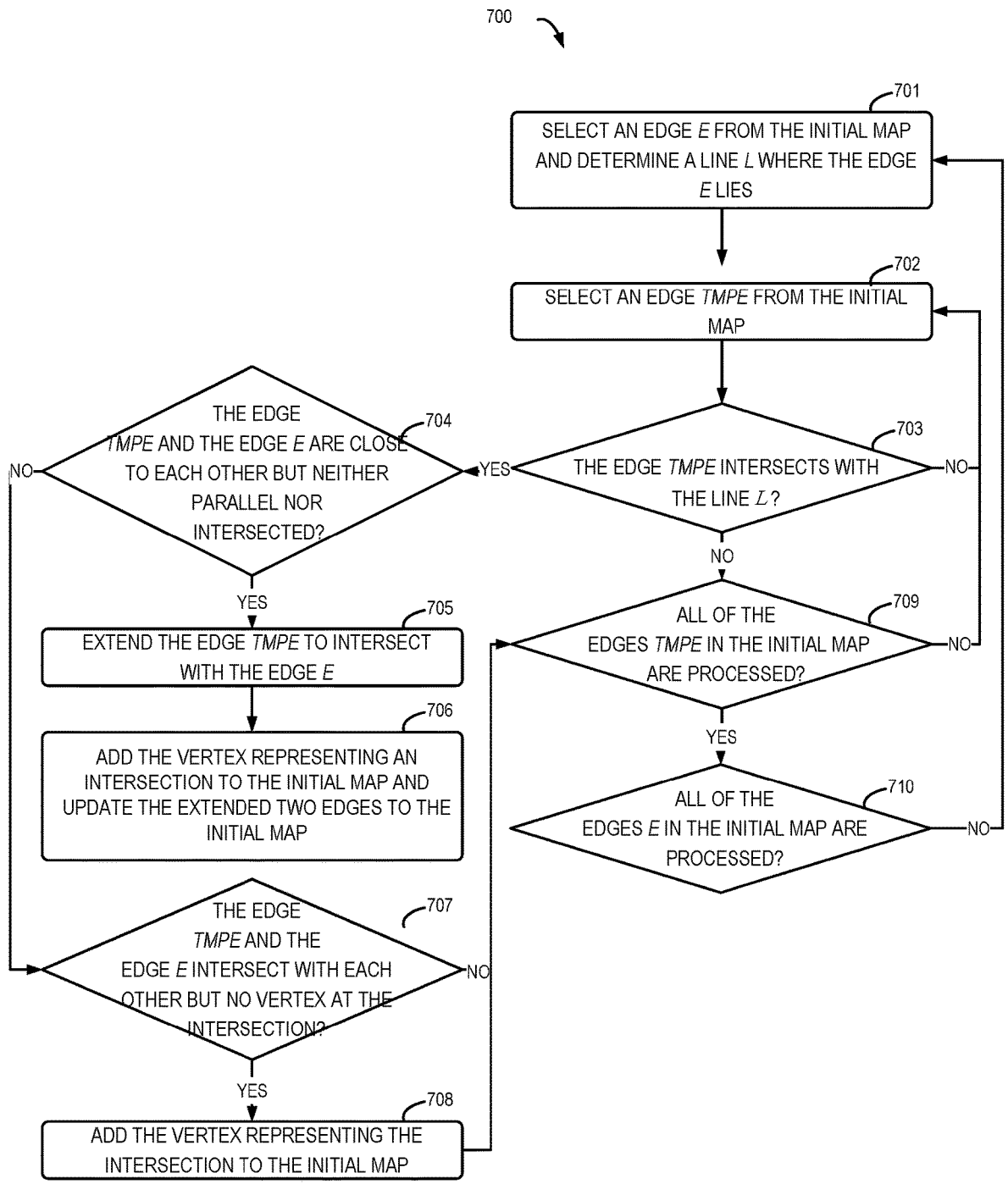
FIG. 7 illustrates a flowchart of a process for processing edge intersections in accordance with some implementations of the subject matter described herein.

FIG. 7 illustrates a flowchart of a process 700 for processing an edge intersection in accordance with implementations of the subject matter described herein. For example, the process 700 may be performed by the floor parsing module 211. It is to be understood that the process 700 may further include additional acts not shown and/or omit the shown acts. The scope of the subject matter described herein is not limited in this regard.

At 701, the floor parsing module 211 selects an edge e randomly from the initial map and finds the line 1 on which the edge e lies. At 702, the floor parsing module 211 selects an edge tmpE from the initial map. At 703, the floor parsing module 211 determines whether the edge e intersects with the edge tmpE. If the result determined at 703 is "No," then the process 700 proceeds to 702 in which the floor parsing module 211 selects a next edge tmpE for processing. If the result determined at 703 is "Yes," then the process 700 proceeds to 704.

At 704, the floor parsing module 211 determines whether the edge e and edge tmpE are close to each other but are neither parallel nor intersected. If the result determined at 704 is "Yes," then at 705, the floor parsing module 211 extends edge e and edge tmpE to intersect. At 706, the floor parsing module 211 adds the vertex representing the intersection to the initial map and replaces the original edge e in the initial map with an extended edge e and replaces the original edge tmpE in the initial map with an extended edge tmpE. If the result determined at 704 is "No," then the process 700 proceeds to 707 where the floor parsing module 211 determines whether the edge e and edge tmpE intersect but without vertex at the intersection. If the result determined at 707 is "Yes," then at 708, the floor parsing module 211 adds the vertex representing the intersection to the initial map, and the process 700 proceeds to 709. If the result determined at 707 is "No," then the process 700 also proceeds to 709.

At 709, the floor parsing module 211 determines if all the edges tmpE in the initial map are traversed. If the result determined at 709 is "No," then the process 700 proceeds to 702 where the floor parsing module 211 selects the next edge tmpE for processing. If the result determined at 709 is "Yes," then the process 700 proceeds to 710 where the floor parsing module 211 determines if all the edges e in the initial map are processed. If the result determined at 710 is "No," then the process 700 proceeds to 701 where the floor parsing module 211 selects the next edge e for processing.

In this way, the floor parsing module 211 can remove edge intersections from the initial map.

Figure 8:
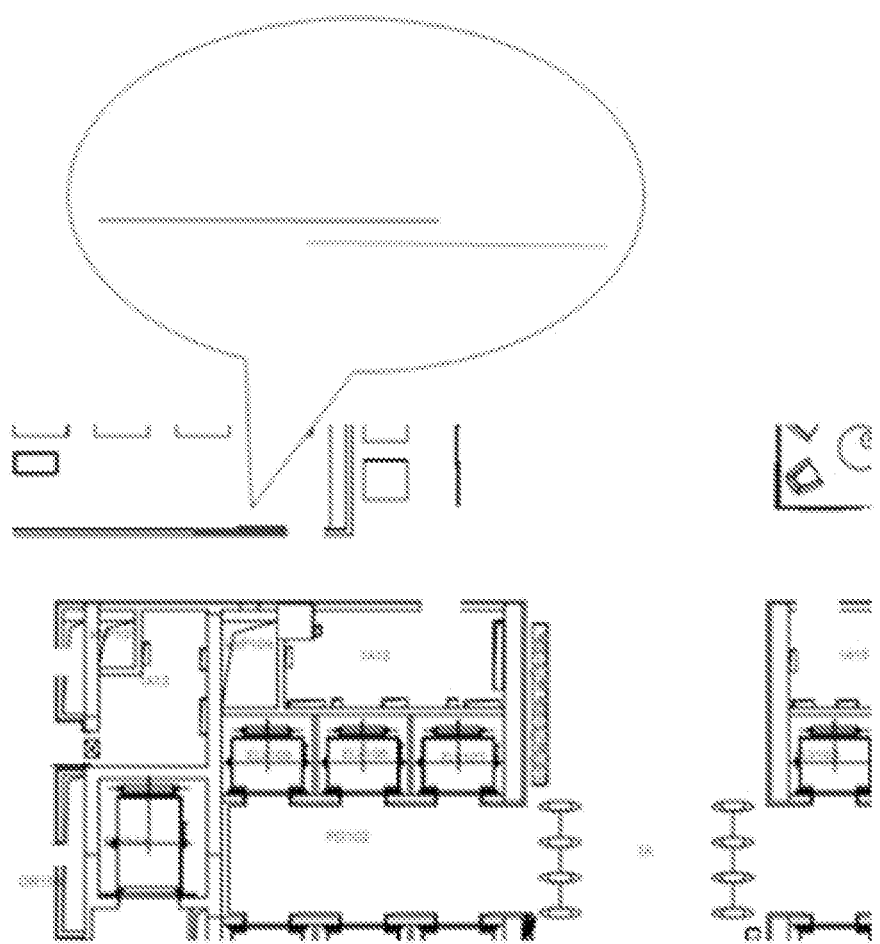
FIG. 8 illustrates a schematic diagram of gaps that possibly exist in a map in accordance with some implementations of the subject matter described herein.

After the overlapped edges and intersections of edges are removed, there may still be gaps existed between edges, which makes a seemingly connected graph actually disconnected. FIG. 8 illustrates such an example in which a seemingly single edge is actually composed of two edges with a gap indiscernible by human eyes. In some implementations, for example, after the overlapped edges and intersections of edges are removed, the floor parsing module 211 may remove gaps between edges from the initial map. In some implementations, the gaps may be divided into bigger gaps and smaller gaps based on the sizes of gaps between edges. The floor parsing module 211 may process bigger gaps and smaller gaps separately. In some implementations, for smaller gaps, the floor parsing module 211 may perform processing in the following way: determining, for each vertex v in the initial map, a set of neighboring vertices each having a distance from the vertex that is below a first predetermined threshold; and replacing the neighboring vertex neighbourV with the vertex v for each neighboring vertex neighbourV in the set of neighboring vertices. In some implementations, for bigger gaps, the floor parsing module 211 may perform processing in the following way: for each vertex v in the initial map, a set of neighboring vertices each having a distance from the vertex that is below a second predetermined threshold; and connecting the vertex v to the neighboring vertex neighbourV for each neighboring vertex neighbourV in the set of neighboring vertices, where the first predetermined threshold is below the second predetermined threshold.

In this way, the floor parsing module 211 can remove gaps between edges from the initial map. It is to be understood that the removal of gaps may introduce new intersection problems. In some implementations, for example, after the gaps between edges are removed, the floor parsing module 211 may perform the intersection removing operation again as described above.

Triangulation

After redundant information is removed and other problems (such as removing redundant edges, intersections of edges and gaps between edges) are processed for the initial map, the floor parsing module 211 may obtain an optimized initial map which is also referred to as a "second map" herein. For example, the second map includes a second group of vertices and edges derived from optimizing the first group of vertices and edges in the initial map. In the second map, information of physical objects on the first floor is stored. However, the second map does not contain information about paths (also referred to as "topology information" herein), for instance, which point can reach which point through which path. Therefore, the map construction subsystem 210 needs to generate information related to the path for the second map.

In some implementations, the triangulation module 212 may apply triangulation to the second map to generate a third map. The "triangulation" used herein is an important preprocessing method used extensively in computational geometry and a successful method of generating paths represented by polygons. The triangulation is performed by inserting edges between endpoints of line segments until all the space is divided into triangles. All the created triangles should have an empty interior, that is, there is no triangle inside another triangle. In this way, objects on the floor and blank space among objects on the floor may be covered and used for further processing subsequently.

Figure 9:
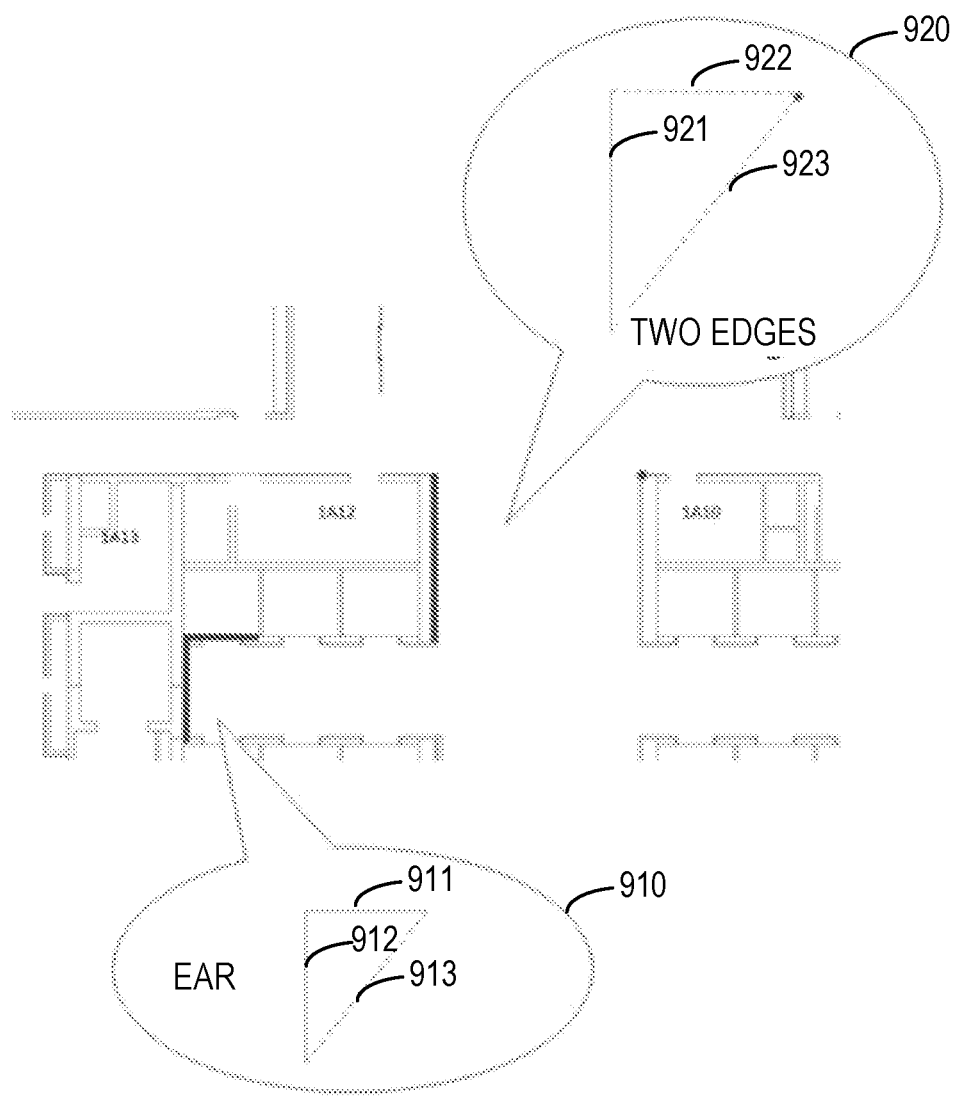
FIG. 9 illustrates a schematic diagram of triangulation in accordance with some implementations of the subject matter described herein.

In some implementations, the second map should be triangulated. The triangulation module 212 should consider two cases shown in FIG. 9. As shown by 910 in FIG. 9, when the two edges 911 and 912 form an "ear" like shape, the two unconnected vertices of the two edges 911 and 912 may be connected to form a new edge 913. As illustrated by 920 in FIG. 9, when the edge 921 does not form an "ear" shape but when an "ear" shape is formed with the edge 921 can intersect with other edges, two new edges 922 and 923 may be formed by connecting the vertices of the edge 921 with a nearby vertex. The triangulation module 212 may process all similar conditions in the second map in the manner shown in FIG. 9. In this way, all "ears" in the second map and isolated vertices can be removed to generate a third map in which edges added through triangulation will cover the blank place and interior of the room, and topology information may be generated based on the third map.

Figure 10:
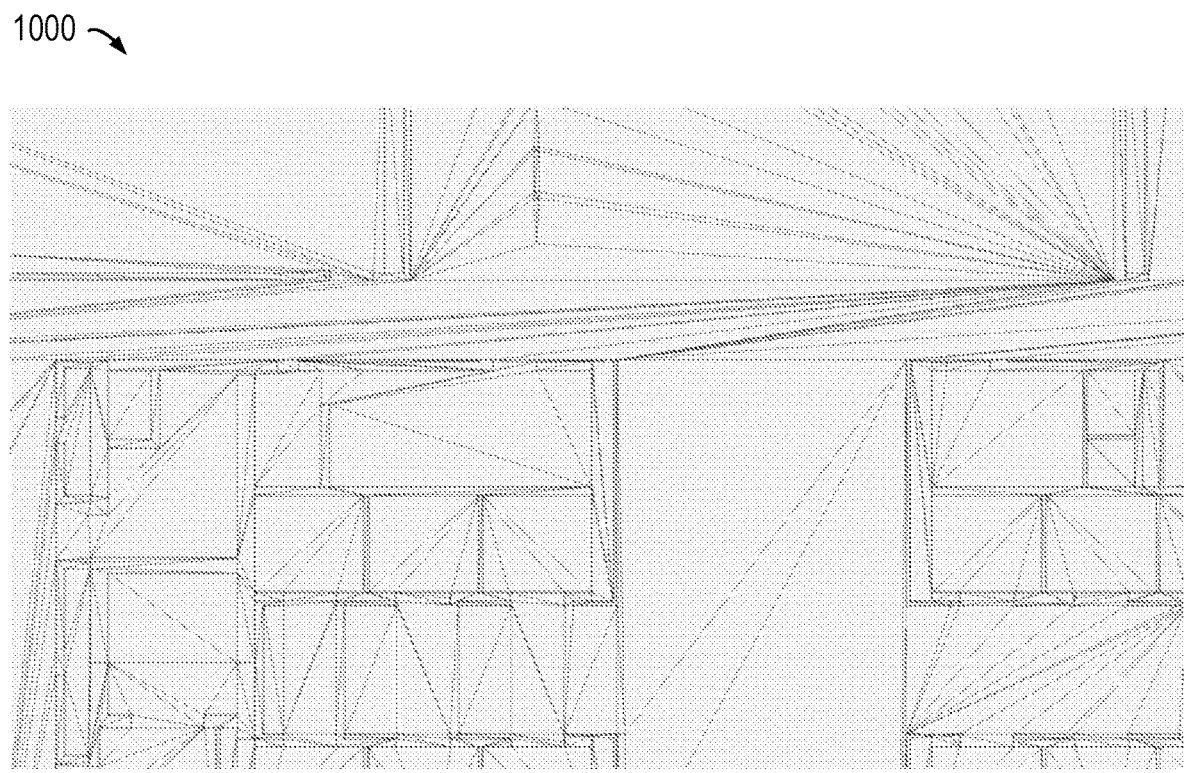
FIG. 10 illustrates a schematic diagram of a map generated through triangulation in accordance with some implementations of the subject matter described herein.

FIG. 10 illustrates an example 1000 of a third map generated through triangulation in accordance with implementations of the subject matter described herein. As shown in FIG. 10, the example third map 1000 may include vertices and edges that belong to the initial map and edges generated through the triangulation. It is to be understood that the edges generated through the triangulation have the type 7 shown in Table 1 of the third map.

Topology Construction

In some implementations, the topology construction module 213 may obtain topology information from the third map generated by the triangulation. In some implementations, the topology construction module 213 may be divided into the following sub-modules: topology generation sub-module, rebalancing sub-module, reconnection sub-module, wall avoidance sub-module and explosion optimization sub-module. Various sub-modules of the topology construction module 213 will be described below in detail.

In some implementations, the topology generation sub-module in the topology construction module 213 may generate topology information by adding vertices and edges to the third map based on heuristics. For example, the edges added by the triangulation in the third map may cover corridors and room interiors of the floor. The topology construction module 213 may add vertices (also referred to as "topology vertices" herein) to each of the edges (for example, at a position in the middle of the edges) added through the triangulation in the third map. If two edges of a basic triangle (i.e., there is no other triangle inside this triangle) in the third map are created through the triangulation, new edges (also referred to herein as "topology edges") connecting the two topology vertices on the two edges are added to the third map. Moreover, if all three edges of the basic triangle in the third map are created through the triangulation, then topology edge parallel to the longest edge of the triangle will not be added in order to prevent the generated topology edge from being too long.

Figure 11:
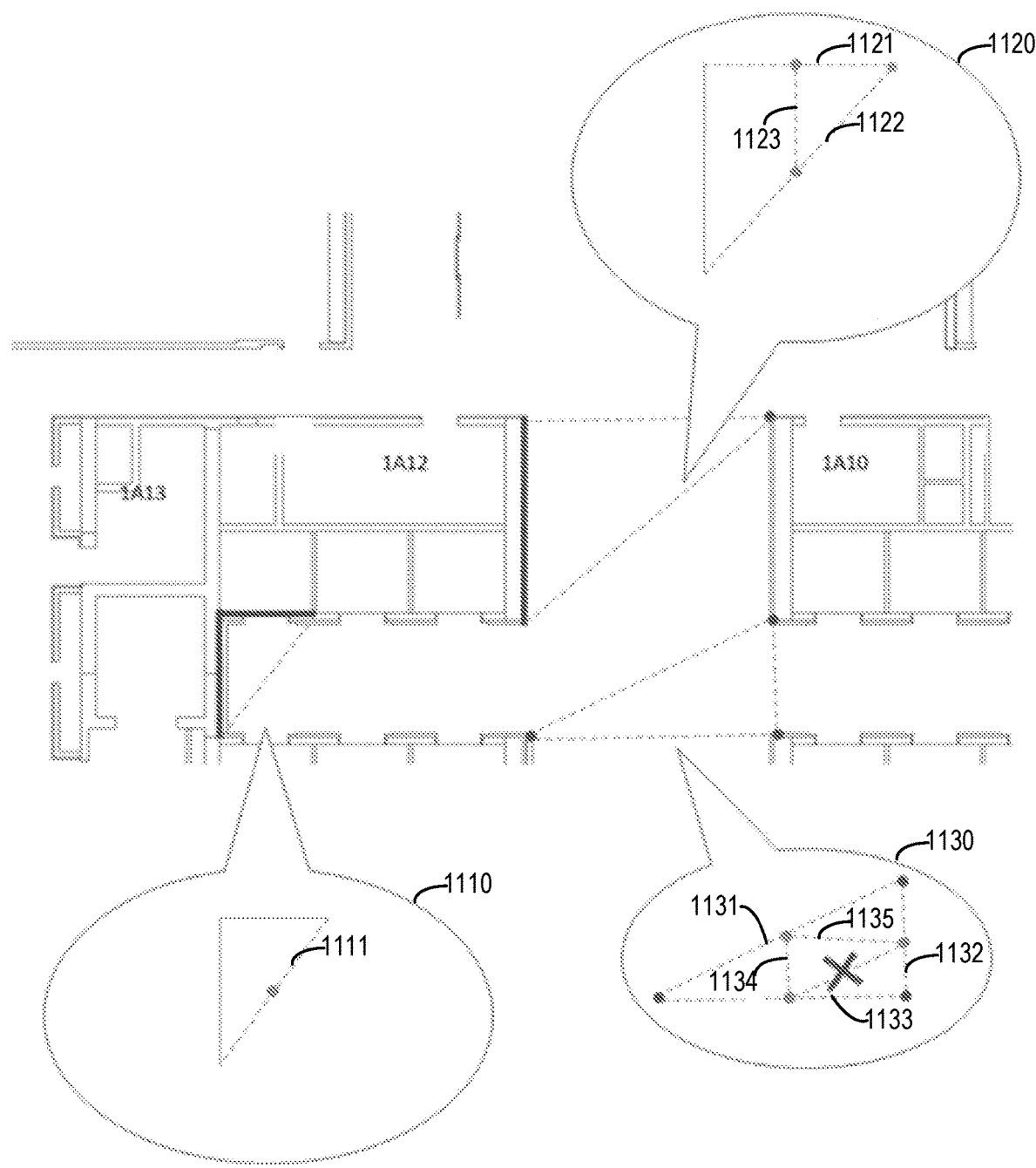
FIG. 11 illustrates a schematic diagram of topology generation in accordance with some implementations of the subject matter described herein.

FIG. 11 illustrates an example of topology generation in accordance with implementations of the subject matter described herein. As shown by 1110 of FIG. 11, only one edge 1111 in the triangle is created through triangulation. Under this condition, only a topology vertex is added to the edge 1111, which may represent a position on a passable path represented by the edge 1111. As shown by 1120 of FIG. 11, the edges 1121 and 1122 in the triangle are created through triangulation. In this case, respective topology vertices may be added to the edges 1121 and 1122 separately and a topology edge 1123 connecting the added topology vertices is created. This topology edge 1123 may represent a passable path on the floor. As shown by 1130 of FIG. 11, edges 1131, 1132 and 1133 of the triangle are all created through the triangulation, and the edge 1131 is the longest. Under this condition, respective topology vertices may be added to the edges 1131, 1132 and 1133 separately, and topology edges 1134 and 1135 connecting the added topology vertices are created but topology edge parallel to the edge 1131 will not be created.

In this way, the topology construction module 213 can add topology information related to passable paths on the floor to the third map, and the map added with the topology information is referred to as a "first map" or "topology map" herein. For example, the first map may contain a plurality of vertices and edges, where one vertex (may be a topology vertex or vertex belonging to a physical object) corresponds to a position on the floor, and an edge connecting two vertices may represent a physical object (namely, an edge belonging to a physical object) connecting two positions corresponding to the two vertices or a passable path (namely, a topology edge).

FIG. 12 illustrates an example for generating a first map by performing triangulation and topology generation processing to the second map generated by the floor parsing module 211 in accordance with implementations of the subject matter described herein. For example, FIG. 12 illustrates an example 1210 of a second map generated by the floor parsing module 211. FIG. 12 further illustrates an example 1220 of a third map generated by applying the triangulation and topology generation as mentioned above to the example map 1210. In the example map 1220, dashed lines represent edges created through the triangulation while black vertices and dotted lines represent topology edges created through the topology generation.

In some implementations, the first map generated by the topology generation sub-module of the topology construction module 213 may be used to provide a location-based service, such as indoor navigation and the like, to the user 240. Additionally or alternatively, the topology construction module 213 may further optimize the first map based on a predetermined rule in order to avoid an existence of unreasonable topology information in the first map. Examples of the predetermined rule include but are not limited to: ensuring any two vertices in the first map reachable to each other, making sure the path length between any two vertices in the first map as short/straight as possible, avoiding a generation of wall penetrating paths, and so on. A more detailed description will be provided below in combination with specific examples. In some implementations, for example, the rebalancing sub-module, reconnection sub-module, wall avoidance sub-module and explosion optimization sub-module in the topology construction module 213 may be used to perform such optimization.

Since the triangulation module 212 possibly simply divides the second map without performing any constraints to the generated triangle, there are probably many very "thin" triangles in the first map. That is, some edge in such kind of triangle is much longer than the shortest edge of the same triangle. If this kind of map is used to construct paths, unreasonable paths may be generated, for example, suggesting a longer path to the user when there is an alternative of a short path. For instance, the rebalancing sub-module of the topology construction module 213 may process the condition mentioned above.

Figure 13:
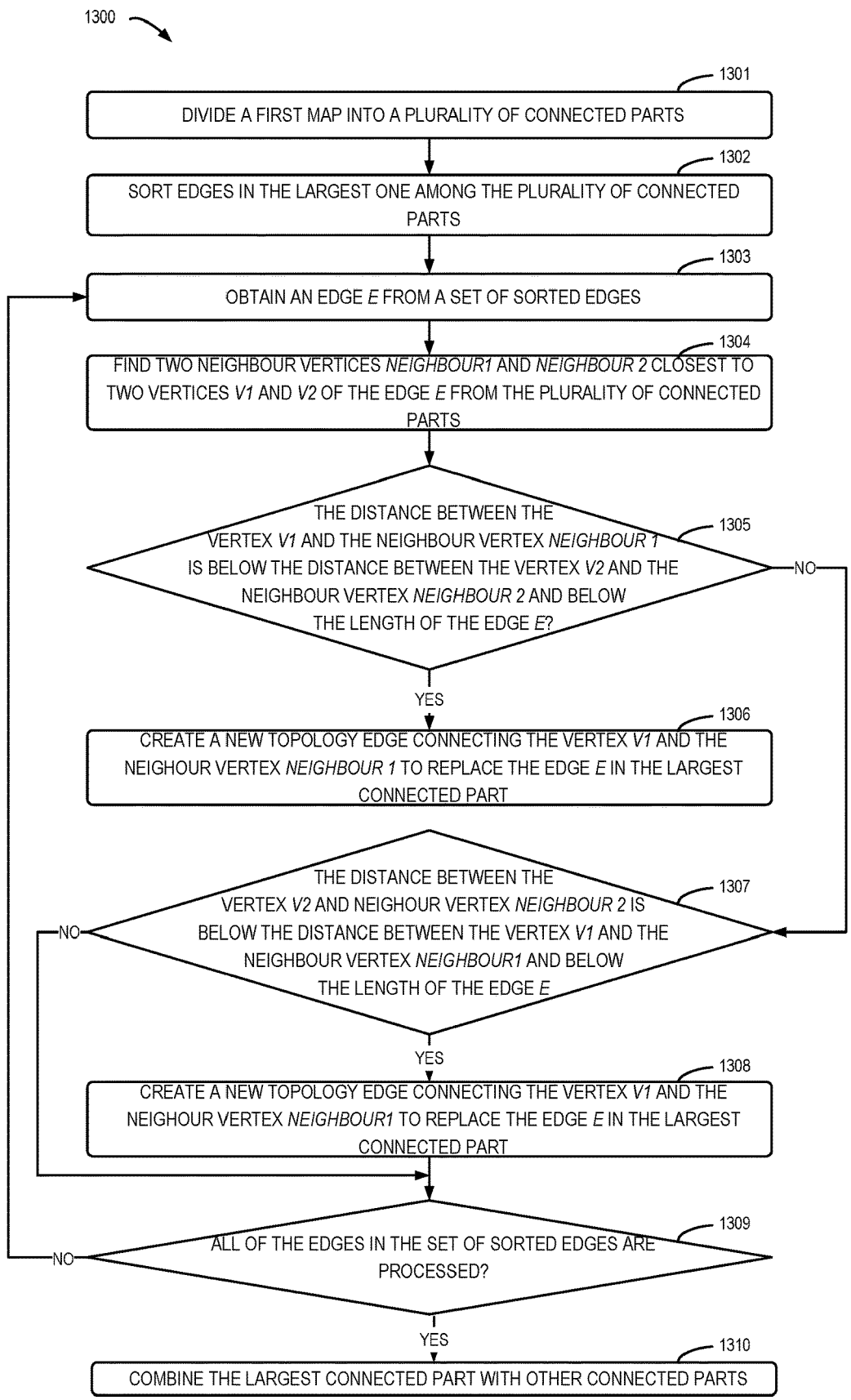
FIG. 13 illustrates a flowchart of a process for rebalance in accordance with some implementations of the subject matter described herein.

FIG. 13 illustrates a flowchart of a process 1300 for rebalancing in accordance with implementations of the subject matter described herein. For example, the process 1300 may be performed by the topology construction module 213 (for example, the rebalancing sub-module therein). It should be understood that the process 1300 may further include additional acts not shown and/or omit the shown acts. The scope of the subject matter described herein is not limited in this regard.

At 1301, the rebalancing sub-module of the topology construction module 213 may divide the first map into a plurality of connected parts, in each of which any two vertices are connected with each other, but these connected parts are not connected with each other. At 1302, the rebalancing sub-module may determine the largest connected part among the plurality of connected parts and sort the edges that exceed a predetermined threshold in the largest connected part from long to short. Then, the rebalancing sub-module may process the set of sorted edges that exceed a predetermined threshold in the largest connected part. At 1303, the rebalancing sub-module may obtain an edge e from the set of sorted edges. At 1304, the rebalancing sub-module may find two neighboring vertices neighbour 1 and neighbour 2 nearest to two vertices v1 and v2 of the edge e respectively from the plurality of connected parts. At 1305, the rebalancing sub-module may determine if the distance between the vertex v1 and the neighboring vertex neighbour 1 is shorter than the distance between the vertex v2 and the neighboring vertex neighbour 2 and shorter than the length of the edge e. If the result determined at 1305 is "Yes," then the process 1300 proceeds to 1306 where the rebalancing sub-module may create a new topology edge connecting the vertex v1 and the neighboring vertex neighbour 1 to replace the edge e. If the result determined at 1305 is "No," then the process 1300 proceeds to 1307 where the rebalancing sub-module may determine if the distance between the vertex v2 and neighboring vertex neighbour 2 is shorter than the distance between the vertex v1 and the neighboring vertex neighbour 1 and shorter than the length of the edge e. If the result determined at 1307 is "Yes," then the process 1300 proceeds to 1308 where the rebalancing sub-module may create a new topology edge between the vertex v2 and the neighboring vertex neighbour 2 to replace the edge e. If the result determined at 1307 is "No," then the process 1300 proceeds to 1309 where the rebalancing module may determine whether all the edges in the set of sorted edges have been processed. If the result determined at 1309 is "No," then the process 1300 proceeds to 1303 where the rebalancing sub-module may obtain a next edge e from the set of sorted edges for processing. If the result determined at 1309 is "Yes," then at 1301, the rebalancing sub-module may merge the largest connected part with the other connected parts among the plurality of connected parts.

Disconnected parts may exist in the rebalanced first map, which makes it impossible to reach one vertex from another vertex. In some implementations, the reconnection sub-module of the topology construction module 213 may process the condition mentioned above. For example, the reconnection sub-module may divide the first map into a plurality of connected parts, in each of which any two vertices are connected with each other, but these connected parts are not connected with each other. Subsequently, the reconnection sub-module may traverse these connected parts to connect two disconnected parts with a topology edge. In this way, the reconnection sub-module of the topology construction module 213 can eliminate the disconnection possibly exited in the first map.

In some cases, the problem of "wall penetrating" may exist in the first map, namely, one topology path penetrates an edge representing a physical object (such as a wall). In some implementations, the wall avoidance sub-module of the topology construction module 213 may process the condition mentioned above.

Figure 14:
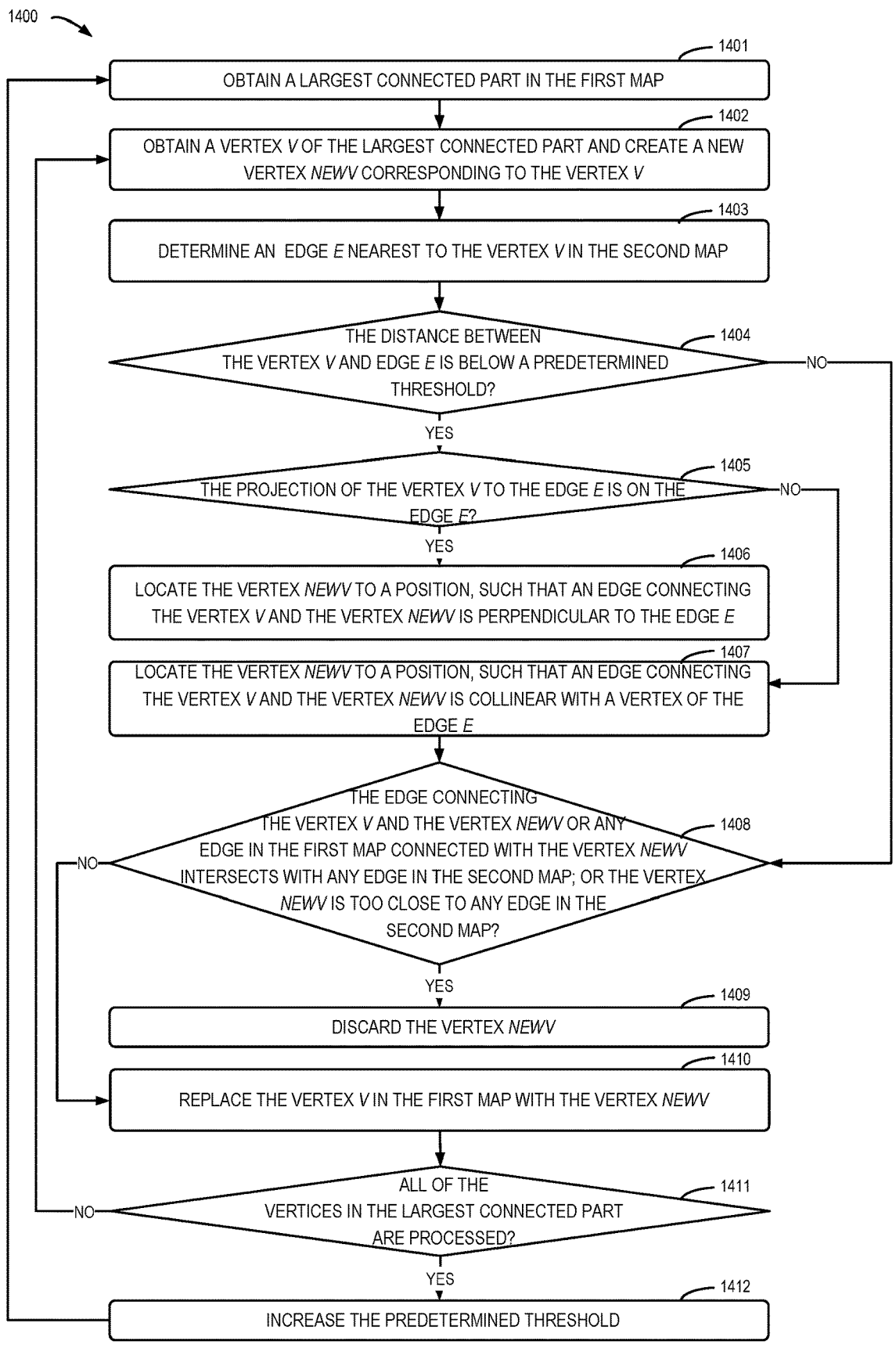
FIG. 14 illustrates a flowchart of a process for eliminating wall-penetrating paths in accordance with some implementations of the subject matter described herein.

FIG. 14 illustrates a flowchart of a process 1400 for eliminating wall penetrating paths in accordance with implementations of the subject matter described herein. For example, the process 1400 may be performed by the topology construction module 213 (for example, the wall avoidance sub-module therein). It should be understood that the process 1400 may further include additional acts not shown and/or omit the shown acts. The scope of the subject matter described herein is not limited in this regard.

At 1401, the wall avoidance sub-module may obtain the largest connected part in the first map. At 1402, the wall avoidance sub-module may obtain a vertex v of the largest connected part and create a new vertex newV corresponding to the vertex v. For example, an initial attribute of the new vertex newV is consistent with that of the vertex v. At 1403, the wall avoidance sub-module may determine the edge e nearest to the vertex v in the second map. At 1404, the wall avoidance sub-module may determine if the distance between the vertex v and the edge e is below a predetermined threshold. For example, an initial value of the predetermined threshold may be determined based on the map size of the second map. If the result determined at 1404 is "Yes," then the process 1400 proceeds to 1405 where the wall avoidance sub-module may determine if the projection of the vertex v to the edge e is on the edge e. If the result determined at 1405 is "Yes," then the process 1400 proceeds to 1406 where the wall avoidance sub-module may position the vertex newV to a position that makes an edge connecting the vertex v and the edge newV perpendicular to the edge e. If the result determined at 1405 is "No," then the process 1400 proceeds to 1407 where the wall avoidance sub-module may locate the vertex newV to a position that makes the edge connecting the vertex v and vertex newV collinear to a vertex of the edge e. Then the process 1400 proceeds to 1408. If the result of determined at 1404 is "No," then process 1400 also proceeds to 1408. At 1408, the wall avoidance sub-module may determine if the following conditions are true: the edge connecting the vertex v and the vertex newV or any edge in the first map connected with the vertex newV intersects with any edge in the second map; or the vertex new V is too close to any edge in the second map. If the result determined at 1408 is "Yes," then at 1409, the wall avoidance sub-module may discard the vertex newV; otherwise, the wall avoidance sub-module may utilize the vertex new V to replace the vertex v in the first map. At 1411, the wall avoidance sub-module may determine if all the vertices in the largest connected part have been processed. If the result determined at 1411 is "Yes," then at 1412, the wall avoidance sub-module may increase the predetermined threshold; otherwise the process 1400 proceeds to 1402 where the wall avoidance sub-module may obtain the next v from the largest connected part for processing.

As illustrated in FIG. 14, the process 1400 may be performed several times to achieve a better result. Moreover, although not shown in FIG. 14, sub-processes including blocks 1403~1409 in the process 1400 may be performed several times to achieve a better result. In this way, the wall avoidance sub-module of the topology construction module 213 can remove topology edges representing "wall penetrating" paths in the first map.

In addition, the first map may be further optimized so that a topology edge from one vertex to another vertex should have the smallest possible distance. For example, in some implementations, it may be considered to connect two vertices, as long as the edge connecting the two will not intersect with any existing edge because any path between the two according to the current first map will be longer than the edge directly connecting the two.

In some implementations, the explosion optimization sub-module of the topology construction module 213 may be configured to process the condition mentioned above. For example, the topology construction module 213 may use the explosion algorithm to connect as many vertices as possible. In some implementations, if two vertices have been connected, or the edge formed by them intersects with any edge in the second map or the first map, no changes will be made to the first map. Otherwise, the topology edge connecting these two vertices may be added to the first map.

In this way, the first map generated by the topology generation sub-module of the topology construction module 213 can be further optimized to avoid the existence of topology information associated with unreasonable paths therein.

Map Cleaning

Figure 15:
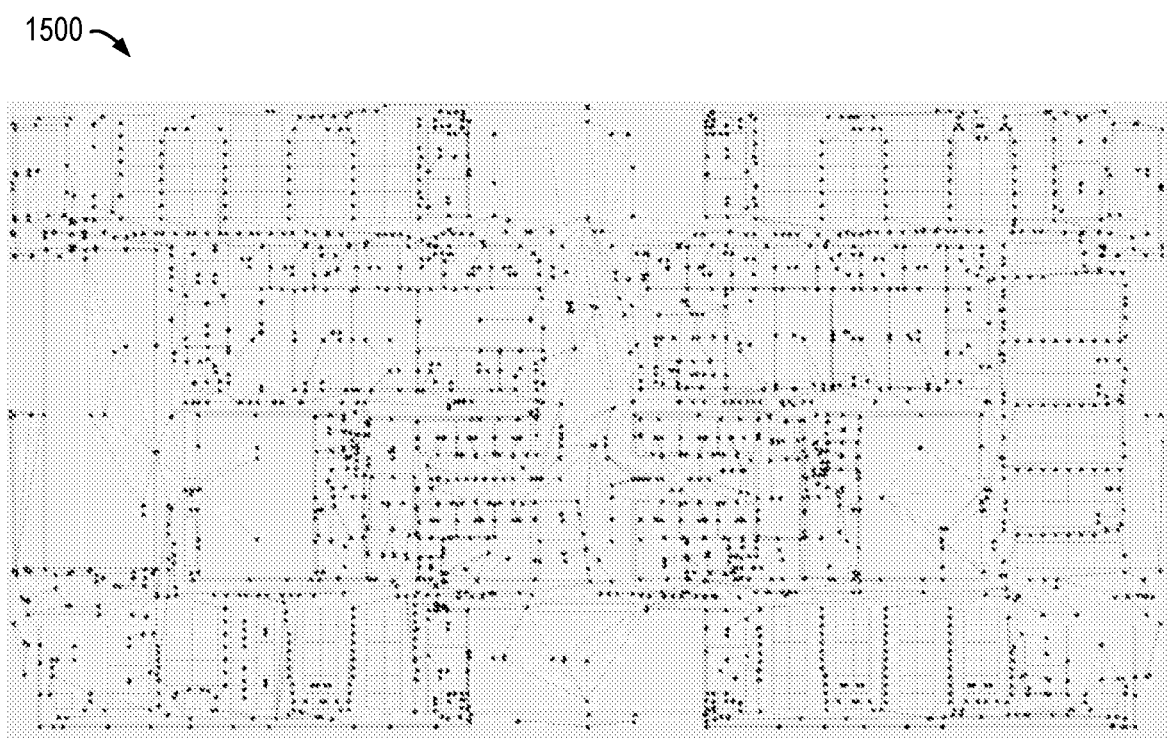
FIG. 15 illustrates a schematic diagram of a topology map without being cleaned in accordance with some implementations of the subject matter described herein.

The first map generated and optimized by the topology construction module 213 may be used for path building. However, under some conditions, the first map generated and optimized by the topology construction module 213 may be mazy and twisted, as shown by an example 1500 of FIG. 15. In some implementations, in order to generate more direct and straight paths during a path building process, the map cleaning module 214 may perform map cleaning for the first map generated and optimized by the topology construction module 213.

In some implementations, in order to clean the first map, the map cleaning module 214 may first group vertices that are connected along a line or near collinear with each other (oblique within 15 degrees). Then, the map cleaning module 214 may adjust coordinates of the vertices within the same group. For example, in some implementations, the map cleaning module 214 may adjust coordinates of vertices within the same group to the room vertex of this group. Alternatively, in some other implementations, the map cleaning module 214 may adjust coordinates of vertices within the same group to an average of vertex coordinates in the group. In some implementations, all the vertices in the first map may be traversed to be processed likewise. Additionally or alternatively, in some implementations, if an edge connecting vertices has a too large or small slope, then the vertex of the edge may not be adjusted. In this way, the cleaned topology map can be generated, and more direct paths may be built on this basis.

Map Connecting

Through all the processing mentioned above, a cleaned first map can be generated for the first floor for path finding. In some implementations, topology maps of different floors in the same building may be further combined. Additionally or alternatively, in some implementations, topology maps of different connected buildings may be further combined. The combined topology maps may be used to provide a location-based service to the user.

For example, the user 240 may upload information (also referred to as "first information" herein) on connection between floors (such as stairs or elevators) and/or information (also referred to as "second information" herein) on connection between different buildings (such as corridors, connection isles and so on) via the web frontend 220. Moreover, the user 240 may further provide information about connection between rooms via the web frontend 220. For example, the map connection module 215 of the map construction sub-system 210 may perform topology map connection based on this information to provide a topology map that can be used, for realizing cross-floor and/or cross-building path building. This topology map, for instance, may be stored in the map database 216 of the map construction sub-system 210.

Path Building

In some implementations, the path construction module 219 may be configured to use a topology map in the map database 216 for path building. For example, in response to receiving information about a starting position and destination position provided by the user 240 via the web frontend 220, the path construction module 219 may determine an optimal path from the starting position to the destination position based on the topology map in the map database 216 and provide the path to the user 240 (for example, the client device 230) for indoor navigation.

Additionally or alternatively, in some implementations, in response to receiving information about the starting position and destination position provided by the user 240 via the web frontend 220 (for example, it may indicate the starting position and destination position on the topology map), the path construction module 219 may look for a separate map (for example, it only stores room vertices) created for vertices of room type, to extract room vertices nearest to the starting position and destination position. Then, the path construction module 219 may determine the shortest path from a start room to a destination room based on the start room vertices and destination room vertices. For example, the shortest path may be generated based on Dijkstra algorithm.

Environment Data Binding

In some implementations, the user 240 may download paths queried through the web frontend 220 to the client device 230 which can provide real-time or quasi real-time navigation instructions to the user 240 based on the downloaded paths. Besides, the client device 230 may be equipped with various sensors. During the indoor navigation, the client device 230 may store environment data (such as Wi-Fi signals, geomagnetic signals, barometer, and so on) collected by various sensors along a trace traveled by the user 240. Such environment data may be uploaded to the map construction sub-system 210 and stored in the environment database 218 of the map construction sub-system 210, to be bound by the environment data binding module 217 of the map construction sub-system 210 with the generated topology map. The map bound with environment data can provide reliable navigation instructions.

Example User Interface

The above illustrates an example system 200 shown in FIG. 2 and the working principle of each component thereof. The following will illustratively show an example user interface of some components in the system 200.

Figure 16:
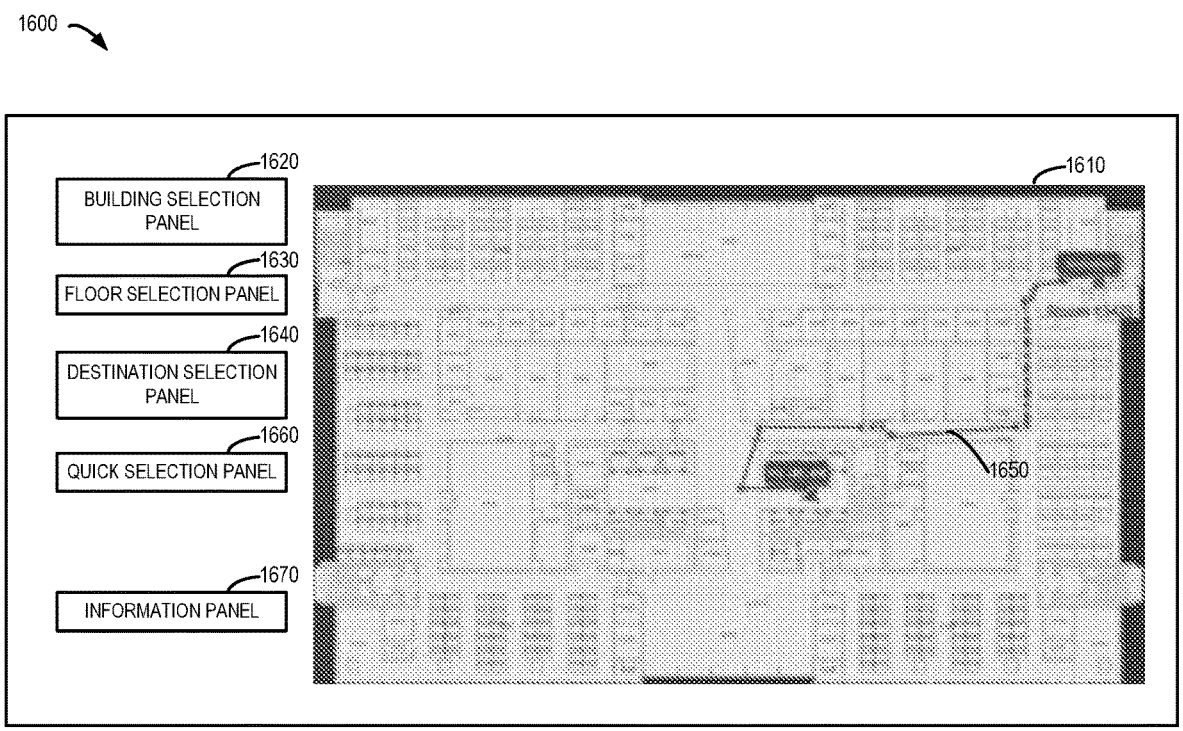
FIG. 16 illustrates a schematic diagram of an example user interface of web frontend in accordance with some implementations of the subject matter described herein.

FIG. 16 illustrates an example user interface 1600 of the web frontend 220. As shown in FIG. 16, the example user interface 1600 may be composed of a map display panel 1610, a building selection panel 1620, a floor selection panel 1630 and a destination panel 1640. With a default starting point on the map display panel 1610, the user can query a path to a place of interest by clicking on a corresponding point on the map. This will trigger the path construction module 219 in the map construction sub-system 210 as described above to construct a shortest path to the destination based on the topology map in the map database 216, and then the path will be drawn on the map, as shown by the path 1650 of FIG. 16. Nearby room information will also be given. After that, the user may clean the path 1650 and query other information, or, for example, download the path 1650 to the client device 230 by scanning a QR code. Through downloading the required path, the user may achieve real-time or quasi real-time indoor navigation with the help of other navigation applications. Besides, the user can also select different floor plans in various buildings with the building selection panel 1620 or floor selection panel 1630. Also, the quick selection panel 1660 holding frequently visited destinations and information panel 1670 showing recent activity places enable the user to have easy access to the desired place.

All the floor plans and generated topology maps may be stored in a backend server, such as the map construction sub-system 210, as individual blobs. For example, the backend server may be deployed in a cloud, where the correspondence among floors, buildings, rooms and floor connection may be stored in separate tables. Besides, the backend server may provide an application programming interface (API). For example, multiple APIs may be provided for both data query tasks and more privileged map-related information uploading/modifying tasks to enhance user experience. Ordinary users may easily query data through the web frontend 220 using query APIs. Privileged users may upload a floor plan to the backend server through an input API, which will trigger the map construction sub-system 210 described above to generate and optimize the topology map based on floor plan. After completion of processing, the generated topology map will be automatically stored in the map database (for example, the map database 216). Moreover, they can register the map to its corresponding building and register the connection of floors through a register API so that the map will show up on the floor selection panel 1630 of the building, and cross-floor paths can be built. In this way, the map construction is scalable. Besides, the privileged users may also change the starting point to satisfy different deployment positions. The place of interest in the quick selection panel 1660 may also be modified. If unsatisfied with the generated path or there is still unreasonable topology information in the topology map, the privileged users can directly modify the topology map through modifying the API.

Figure 17:
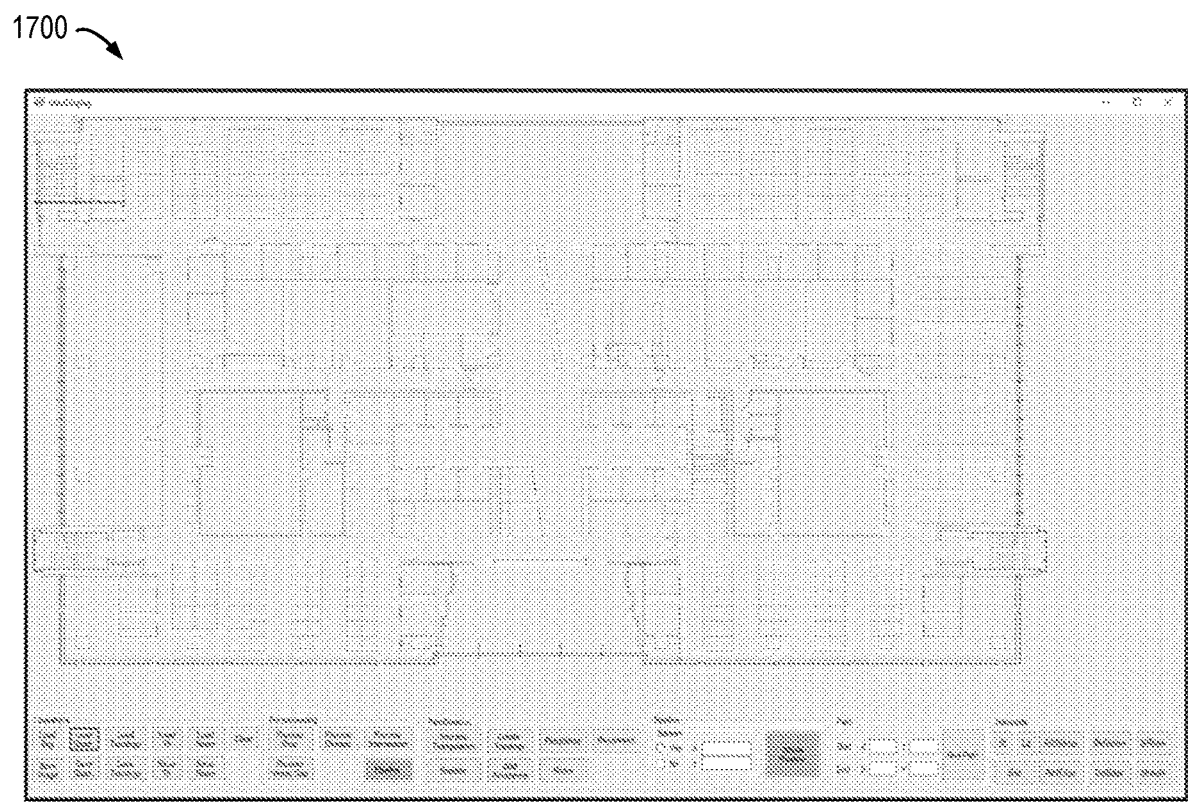
FIG. 17 illustrates a schematic diagram of a visualization tool in accordance with some implementations of the subject matter described herein.

In some implementations, the backend server such as the map construction sub-system 210 may provide visualization tools for the privileged users so that the privileged users can view the entire processing pipeline locally. For example, FIG. 17 illustrates an example of such a visualization tool

1700. For example, the visualization tool allows the privileged users to view the map (namely, MapGraph) generated at each processing stage, and may apply each processing stage individually. Besides, a hardcode module may be provided to the privileged users together with the modification of API, so that the privileged users can modify an existing topology map or directly create a topology map in a visualized manner.

A scheme for providing indoor location-based services in accordance with implementations of the subject matter described herein has been described above. It can be seen from the above description that the solution in accordance with implementations of the subject matter described herein enables map understanding in a way of converting a floor plan into a generic indoor map representation in a specific format by understanding the geometrical structure of the floor plan and extracting passable paths therefrom. The generic indoor map representation may be used to provide indoor navigation services and other location-based services. Moreover, this generic indoor map representation may be used as an infrastructure to serve other location-based applications. Furthermore, this generic indoor map representation may be further combined with other data sources and a third-party navigation application to improve the quality of data collection and improve reliability of indoor navigation. By binding the generic indoor map representation with corresponding environment data, a real-time indoor navigation service can be provided independent of any infrastructure (such as Wi-Fi hotspots or Bluetooth beacons).

Example Process

Figure 18:
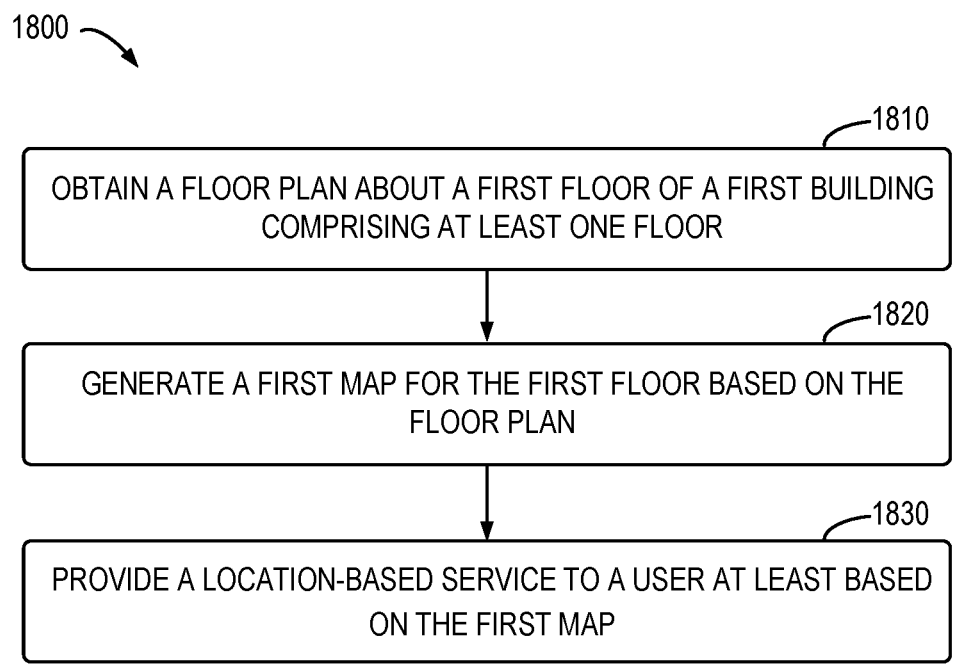
FIG. 18 illustrates a flowchart of a process for providing indoor location-based services in accordance with some implementations of the subject matter described herein.

FIG. 18 illustrates a flowchart of a process 1800 for providing indoor location-based services in accordance with some implementations of the subject matter described herein. The process 1800 may be implemented with the location service module 122 shown in FIG. 1 and/or the map construction sub-system 210 shown in FIG. 2. It should be understood that the process 1800 may further include additional acts not shown and/or omit the shown acts. The scope of the subject matter described herein is not limited in this regard.

At 1810, the location service module 122 obtains a floor plan about a first floor of a first building comprising at least one floor.

At 1820, the location service module 122 generates a first map for the first floor based on the floor plan, the first map including a plurality of vertices and edges, where one vertex corresponds to a position on the first floor, an edge connecting two vertices represents a physical object or a passable path on the first floor, and two positions corresponding to the two vertices are located at the physical object or on the passable path.

At 1830, the location service module 122 provides a location-based service to a user at least based on the first map.

In some implementations, providing the location-based service to the user at least based on the first map includes: obtaining a starting position and destination position of the user on the first map; determining a path from the starting position to the destination position at least based on the first map, the path being represented by a sequence of vertices and edges from a plurality of vertices and edges; and providing the path to the user.

In some implementations, providing the location-based service to the user at least based on the first map comprises: binding the first map with environment data of the first floor; and providing the location-based service to the user based on the first map bound with environment data.

In some implementations, generating the first map includes: generating an initial map for the first floor based on the floor plan, the initial map including a first group of vertices and edges representing outlines of physical objects on the first floor; optimizing the initial map to generate a second map for the first floor, the second map including a second group of vertices and edges derived from optimizing the first group of vertices and edges; and generating the first map based on the second map.

In some implementations, optimizing the initial map includes: identifying a specific physical object from the first group of vertices and edges, the specific physical object being represented by a set of vertices and edges having a specific feature; and removing, from the set of vertices and edges, at least one of a redundant vertex and a redundant edge.

In some implementations, the specific physical object includes a door.

In some implementations, optimizing the initial map includes: removing at least one of the following from the initial map: an overlapped edge, an intersection of edges and a gap between edges.

In some implementations, generating the first map based on the second map includes: generating a third map by applying triangulation to the second map, the third map including a second group of vertices and edges and at least one edge added through triangulation; and generating the first map by adding at least one of the following to the third map based on heuristics: a vertex representing a position on a passable path on the first floor, where the vertex is on at least one edge, and an edge representing a passable path on the first floor.

In some implementations, the process 1800 further includes: optimizing the generated first map based on a predetermined rule to avoid an existence of unreasonable topology information in the first map.

In some implementations, the first building further comprises a second floor connected with the first floor, and the process 1800 further includes: obtaining first information of a connection between the first floor and the second floor; combining the first map and a fourth map for the second floor based on the first information to generate a fifth map for the first building; and providing the location-based service to the user based on the fifth map.

In some implementations, the first building is connected with the second building, and the process 1800 further includes: obtaining second information about a connection between the first building and the second building; combining the fifth map and a sixth map for the second building based on the second information; and providing the location-based service to the user based on the combined map.

Example Implementations

Some exemplary implementations of the subject matter described herein are listed below.

In a first aspect, there is provided a computer-implemented method. The method comprises: obtaining a floor plan about a first floor of a first building comprising at least one floor; generating a first map for the first floor based on the floor plan, the first map including a plurality of vertices and edges, wherein one vertex corresponds to a position on the first floor, an edge connecting two vertices represents a physical object or passable path on the first floor, and two positions corresponding to the two vertices are located at the physical object or on the passable path; and providing a location-based service to a user at least based on the first map.

In some implementations, providing the location-based service to the user at least based on the first map comprises: obtaining a starting position and a destination position of the user on the first map; determining a path from the starting position to the destination position at least based on the first map, the path being represented by a sequence of vertices and edges from the plurality of vertices and edges; and providing the path to the user.

In some implementations, providing the location-based service to the user at least based on the first map comprises: binding the first map with environment data of the first floor; and providing the location-based service to the user based on the first map bound with the environment data.

In some implementations, generating the first map comprises: generating an initial map for the first floor based on the floor plan, the initial map including a first group of vertices and edges representing outlines of physical objects on the first floor; optimizing the initial map to generate a second map for the first floor, the second map including a second group of vertices and edges derived from optimizing the first group of vertices and edges; and generating the first map based on the second map.

In some implementations, optimizing the initial map comprises: identifying a specific physical object from the first group of vertices and edges, the specific physical object being represented by a set of vertices and edges having a specific feature; and removing, from the set of vertices and edges, at least one of a redundant vertex and a redundant edge.

In some implementations, the specific physical object comprises a door.

In some implementations, optimizing the initial map comprises: removing at least one of the following from the initial map: an overlapped edge, an intersection of edges and a gap between edges.

In some implementations, generating the first map based on the second map comprises: generating a third map by applying triangulation to the second map, the third map including the second group of vertices and edges and at least one edge added through the triangulation; and generating the first map by adding at least one of following to the third map based on heuristics: a vertex representing a position on a passable path on the first floor, wherein the vertex is on the at least one edge, and an edge representing a passable path on the first floor.

In some implementations, the method further comprises: optimizing the generated first map based on a predetermined rule to avoid an existence of unreasonable topology information in the first map.

In some implementations, the first building further comprises a second floor connected with the first floor, and the method further comprises: obtaining first information about a connection between the first floor and the second floor; combining the first map and a fourth map for the second floor based on the first information to generate a fifth map for the first building; and providing the location-based service to the user based on the fifth map.

In some implementations, the first building is connected with the second building, and the method further comprises: obtaining second information about a connection between the first building and the second building; combining the fifth map and a sixth map for the second building based on the second information; and providing the location-based service to the user based on the combined map.

In a second aspect, there is provided an electronic device. The device comprises: a processing unit; and a memory coupled to the processing unit and storing instructions executable by the processing unit, the instructions, when executed by the processing unit, causing the device to perform acts comprising: obtaining a floor plan about a first floor of a first building comprising at least one floor; generating a first map for the first floor based on the floor plan, the first map including a plurality of vertices and edges, wherein one vertex corresponds to a position on the first floor, an edge connecting two vertices represents a physical object or a passable path on the first floor, and two positions corresponding to the two vertices are located at the physical object or on the passable path; and providing a location-based service to a user at least based on the first map.

In some implementations, providing the location-based service to the user at least based on the first map comprises: obtaining a starting position and a destination position of the user on the first map; determining a path from the starting position to the destination position at least based on the first map, the path being represented by a sequence of vertices and edges from the plurality of vertices and edges; and providing the path to the user.

In some implementations, providing the location-based service to the user at least based on the first map comprises: binding the first map with environment data of the first floor; and providing the location-based service to the user based on the first map bound with the environment data.

In some implementations, generating the first map comprises: generating an initial map for the first floor based on the floor plan, the initial map including a first group of vertices and edges representing outlines of physical objects on the first floor; optimizing the initial map to generate a second map for the first floor, the second map including a second group of vertices and edges derived from optimizing the first group of vertices and edges; and generating the first map based on the second map.

In some implementations, optimizing the initial map comprises: identifying a specific physical object from the first group of vertices and edges, the specific physical object being represented by a set of vertices and edges having a specific feature; and removing, from the set of vertices and edges, at least one of a redundant vertex and a redundant edge.

In some implementations, the specific physical object comprises a door.

In some implementations, optimizing the initial map comprises: removing at least one of the following from the initial map: an overlapped edge, an intersection of edges and a gap between edges.

In some implementations, generating the first map based on the second map comprises: generating a third map by applying triangulation to the second map, the third map including the second group of vertices and edges and at least one edge added through the triangulation; and generating the first map by adding at least one of following to the third map based on heuristics: a vertex representing a position on a passable path on the first floor, and an edge representing a passable path on the first floor.

In some implementations, the acts further comprise: optimizing the generated first map based on a predetermined rule to avoid an existence of unreasonable topology information in the first map.

In some implementations, the first building further comprises a second floor connected with the first floor, and the acts further comprise: obtaining first information about a connection between the first floor and the second floor;

combining the first map and the fourth map for the second floor based on the first information to generate a fifth map for the first building; and providing the location-based service to the user based on the fifth map.

In some implementations, the first building is connected with the second building, and the acts further comprise: obtaining second information about a connection between the first building and the second building; combining the fifth map and a sixth map for the second building based on the second information; and providing the location-based service to the user based on the combined map.

In a third aspect, there is provided a computer program product tangibly stored on a non-transitory computer storage medium and including computer-executable instructions which, when executed on a device, causes the device to perform the method in the first aspect of the subject matter described herein.

In a fourth aspect, there is provided a computer-readable medium storing computer-executable instructions thereon which, when executed by the device, cause the device to perform the method in the first aspect of the subject matter described herein.

The functionalities described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and the like.

Program code for carrying out the methods of the subject matter described herein may be written in any combination of one or more programming languages. This program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine executed as a stand-alone software package partly on the machine, partly on a remote machine, or entirely on the remote machine or server.

In the context of the subject matter described herein, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations be performed to achieve the desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
obtaining a floor plan about a first floor of a first building comprising at least one floor;
identifying, using a floor parsing module, vertices and edges on the floor plan for the first floor and generating a first map for the first floor based on the floor plan, the first map including the identified vertices and edges, wherein one vertex corresponds to a position on the first floor, an edge connecting two vertices represents a physical object or a passable path on the first floor, and two positions corresponding to the two vertices are located at the physical object or on the passable path;
preprocessing the first map using a triangulation module to add new edges to the first map by applying triangulation to the vertices by inserting edges between endpoints of the vertices until the first floor is divided into triangles, each triangle having an empty interior, and using a topology construction module to add a topology vertex to each new edge, the topology vertex representing a passable position on the floor plan;
determining, using a path construction module, a path between a starting position and a destination position on the first map using the topology vertices of the new edges;
collecting, via sensors of a user device, real-time environment data comprising at least one of WiFi signal data, geomagnetic signal data, and barometer signal data;
binding the determined path with the collected environment data by storing the environment data in an environment database, associating the stored environment data with corresponding positions along the determined path, and determining a current position of the user device by comparing current sensor data to the stored environment data;
providing a location-based service comprising navigation instructions to the user device at least based on the determined path; and
updating the navigation instructions in real-time as the user device moves along the determined path based on the collected environment data.

2. The method according to claim 1, wherein providing the location-based service to the user device at least based on the determined path comprises:
obtaining the starting position and the destination position of the user device on the first map;
wherein determining the path between the starting position and the destination position comprises determining the path from the starting position to the destination position at least based on the first map, the determined path being represented by a sequence of vertices and edges from the plurality of vertices and edges, and providing the determined path to the user device.

3. The method according to claim 1, wherein generating the first map comprises:
generating an initial map for the first floor based on the floor plan, the initial map including a first group of vertices and edges representing outlines of physical objects on the first floor;
optimizing the initial map to generate a second map for the first floor, the second map including a second group of vertices and edges derived from optimizing the first group of vertices and edges; and
generating the first map based on the second map.

4. The method according to claim 3, wherein optimizing the initial map comprises:
identifying a specific physical object from the first group of vertices and edges, the specific physical object being represented by a set of vertices and edges having a specific feature; and
removing, from the set of vertices and edges, at least one of a redundant vertex and a redundant edge.

5. The method according to claim 4, wherein the specific physical object comprises a door.

6. The method according to claim 3, wherein optimizing the initial map comprises:
removing at least one of the following from the initial map:
an overlapped edge, an intersection of edges and a gap between edges.

7. The method according to claim 3, wherein generating the first map based on the second map comprises:
generating a third map by applying triangulation to the second map, the third map including the second group of vertices and edges and at least one edge added through the triangulation; and
generating the first map by adding at least one of following to the third map based on heuristics:
a vertex representing a position on a passable path on the first floor, wherein the vertex is on the at least one edge, and
an edge representing a passable path on the first floor.

8. The method according to claim 7, further comprising:
optimizing the generated first map based on a predetermined rule to avoid an existence of unreasonable topology information in the first map.

9. The method according to claim 1, wherein the first building further comprises a second floor connected with the first floor, and the method further comprises:
obtaining first information about a connection between the first floor and the second floor;
combining the first map and a fourth map for the second floor based on the first information to generate a fifth map for the first building, and
providing the location-based service to the user device based on the fifth map.

10. The method according to claim 9, wherein the first building is connected with the second building, and the method further comprises:
obtaining second information about a connection between the first building and the second building;
combining the fifth map and a sixth map for the second building based on the second information; and
providing the location-based service to the user device based on the combined map.

11. An electronic device, comprising:
a processing unit; and
a memory coupled to the processing unit and storing instructions executable by the processing unit, the instructions, when executed by the processing unit, causing the device to perform acts comprising:
obtaining a floor plan about a first floor of a first building comprising at least one floor;
identifying vertices and edges on the floor plan for the first floor;
generating a map for the first floor based on the floor plan, the map including the identified vertices and edges, wherein one vertex corresponds to a position on the first floor, an edge connecting two vertices represents a physical object or a passable path on the first floor, and two positions corresponding to the two vertices are located at the physical object or on the passable path;
preprocessing the first map to add new edges to the first map by applying triangulation to the vertices by inserting edges between endpoints of the vertices until the first floor is divided into triangles, each triangle having an empty interior, and to add a topology vertex to each new edge, the topology vertex representing a passable position on the floor plan;
determining a path between a starting position and a destination position on the first map using the topology vertices of the new edges;
collecting, via sensors of a user device, real-time environment data comprising at least one of WiFi signal data, geomagnetic signal data, and barometer signal data;
binding the determined path with the collected environment data by storing the environment data in an environment database, associating the stored environment data with corresponding positions along the determined path, and determining a current position of the user device by comparing current sensor data to the stored environment data;
providing a location-based service comprising navigation instructions to the user device at least based on the determined path; and
updating the navigation instructions in real-time as the user device moves along the determined path based on the collected environment data.

12. The device according to claim 11, wherein providing the location-based service to the user device at least based on the determined path comprises:
obtaining the starting position and the destination position of the user device on the first map;
wherein determining the path between the starting position and the destination position comprises determining the path from the starting position to the destination position at least based on the first map, the determined path being represented by a sequence of vertices and edges from the plurality of vertices and edges; and
providing the determined path to the user device.

13. A computer program product being stored on a computer storage medium and comprising machine-executable instructions which, when executed on a device, cause the device to perform acts comprising:
obtaining a floor plan about a first floor of a first building comprising at least one floor;
identifying vertices and edges on the floor plan for the first floor;
generating a first map for the first floor based on the floor plan, the first map including the identified vertices and edges, wherein one vertex corresponds to a position on the first floor, an edge connecting two vertices represents a physical object or a passable path on the first floor, and two positions corresponding to the two vertices are located at the physical object or on the passable path;

preprocessing the first map to add new edges to the first map by applying triangulation to the vertices by inserting edges between endpoints of the vertices until the first floor is divided into triangles, each triangle having an empty interior, and to add a topology vertex to each new edge, the topology vertex representing a passable position on the floor plan;

determining a path between a starting position and a destination position on the first map using the topology vertices of the new edges;

collecting, via sensors of a user device, real-time environment data comprising at least one of WiFi signal data, geomagnetic signal data, and barometer signal data;

binding the determined path with the collected environment data by storing the environment data in an environment database, associating the stored environment data with corresponding positions along the determined path, and determining a current position of the user device by comparing current sensor data to the stored environment data;

providing a location-based service comprising navigation instructions to the user device at least based on the determined path; and updating the navigation instructions in real-time as the user device moves along the determined path based on the collected environment data.

14. The computer program product according to claim 13, wherein providing the location-based service to the user device at least based on the determined path comprises:

obtaining the starting position and the destination position of the user device on the first map;

wherein determining the path between the starting position and the destination position comprises determining the path from the starting position to the destination position at least based on the first map, the determined path being represented by a sequence of vertices and edges from the plurality of vertices and edges; and providing the determined path to the user device.

15. The device according to claim 11, wherein generating the first map comprises:

generating an initial map for the first floor based on the floor plan, the initial map including a first group of vertices and edges representing outlines of physical objects on the first floor;

optimizing the initial map to generate a second map for the first floor, the second map including a second group of vertices and edges derived from optimizing the first group of vertices and edges; and generating the first map based on the second map.

16. The device according to claim 15, wherein optimizing the initial map comprises:

identifying a specific physical object from the first group of vertices and edges, the specific physical object being represented by a set of vertices and edges having a specific feature; and removing, from the set of vertices and edges, at least one of a redundant vertex and a redundant edge, wherein the specific physical object comprises a door.

17. The method according to claim 1, wherein applying triangulation to the vertices, using the triangulation module, by inserting edges between endpoints of the vertices comprises until all blank space in the first floor is divided into triangles.

* * * * *